US012734816B2

(12) United States Patent
Nagashima et al.

(10) Patent No.: US 12,734,816 B2
(45) Date of Patent: Sep. 15, 2026

(54) INK CARTRIDGE AND PRINTING APPARATUS

(71) Applicant: SEIKO EPSON CORPORATION, Tokyo (JP)

(72) Inventors: Takumi Nagashima, Matsumoto (JP); Yoshihiro Koizumi, Shiojiri (JP); Tadahiro Mizutani, Shiojiri (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 117 days.

(21) Appl. No.: 18/905,662

(22) Filed: Oct. 3, 2024

(65) Prior Publication Data

US 2025/0115051 A1 Apr. 10, 2025

(30) Foreign Application Priority Data

Oct. 4, 2023 (JP) ................................ 2023-172619

(51) Int. Cl.
*B41J 2/175* (2006.01)

(52) U.S. Cl.
CPC ....... *B41J 2/17553* (2013.01); *B41J 2/17513* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 29/13; G03G 15/0881; G03G 15/0882; G03G 15/0886; G03G 15/0894
See application file for complete search history.

(56) References Cited

U.S. PATENT DOCUMENTS 6,164,769 A * 12/2000 Inada .................. B41J 2/17536 347/86
6,464,339 B1 * 10/2002 Ardito .................. B41J 2/17513 347/49
6,764,170 B2 * 7/2004 Ardito .................. B41J 2/17536 347/86
7,275,816 B2 * 10/2007 Mukai .................. B41J 2/17533 347/86

(Continued)

FOREIGN PATENT DOCUMENTS

JP 2022-148023 A 10/2022

*Primary Examiner* — Anh T Vo
(74) *Attorney, Agent, or Firm* — Oliff PLC

(57) ABSTRACT

Provided is an aspect as an ink cartridge to be mounted to a printing machine including an ink introduction portion. The ink cartridge includes a containing portion configured to contain ink, a bottom wall being one of wall surfaces forming the ink cartridge and forming an opening portion through which the ink introduction portion is inserted, a sealing portion formed as a part of the bottom wall and having a shape configured to close the opening portion, a separation portion provided at a boundary between the sealing portion and the bottom wall, the separation portion configured to make the sealing portion removable from the bottom wall, and an ink supply portion configured to supply the ink contained in the containing portion to the printing machine when the ink introduction portion is inserted through the opening portion exposed by removing the sealing portion from the bottom wall by the separation portion.

10 Claims, 15 Drawing Sheets

(56) References Cited

U.S. PATENT DOCUMENTS

| | | | | |
|---|---|---|---|---|
| 7,303,090 | B2 * | 12/2007 | Nanjo | B41J 2/17553 53/381.1 |
| 11,919,315 | B2 | 3/2024 | Mizutani et al. | |
| 2006/0221152 | A1 * | 10/2006 | Katada | B41J 2/17513 347/86 |

* cited by examiner

INK CARTRIDGE AND PRINTING APPARATUS

The present application is based on, and claims priority from JP Application Serial Number 2023-172619, filed Oct. 4, 2023, the disclosure of which is hereby incorporated by reference herein in its entirety.

BACKGROUND

1. Technical Field

The present disclosure relates to an ink cartridge and a printing apparatus to which the ink cartridge is mounted.

2. Related Art

In an ink cartridge or the like containing ink for a printer, as described in JP-A-2022-148023, a configuration has been proposed in which a film is welded to a supply port of liquid in order to prevent liquid leakage or evaporation during transportation or storage before use of the cartridge. On the other hand, the liquid supply port of the cartridge needs to be opened when the cartridge is mounted to an apparatus such as a printer that uses the liquid supplied from the cartridge. Therefore, when the film is welded to the liquid supply port to form the sealing portion, peeling-off of the film has been required before the cartridge is mounted.

In the configuration in which the liquid supply port is sealed by the film, the film is a member separate from the cartridge, and therefore, there is a problem that a process such as welding is required for sealing. This configuration may also require, before mounting of the cartridge, the film of the liquid supply port to be reliably peeled off and the cartridge to be mounted without the film being left unpeeled.

SUMMARY

The present disclosure can be realized as the following aspects or application examples.

An embodiment according to the present disclosure is an aspect as an ink cartridge to be mounted to a printing machine including an ink introduction portion. The ink cartridge includes a containing portion configured to contain ink, a bottom wall being one of wall surfaces forming the ink cartridge, the bottom wall forming an opening portion through which the ink introduction portion is inserted, a sealing portion formed as a part of the bottom wall and having a shape configured to close the opening portion, a separation portion provided at a boundary between the sealing portion and the bottom wall, the separation portion configured to make the sealing portion removable from the bottom wall, and an ink supply portion configured to supply the ink contained in the containing portion to the printing machine when the ink introduction portion is inserted through the opening portion exposed by removing the sealing portion from the bottom wall by the separation portion.

DESCRIPTION OF EMBODIMENTS

Figure 1:
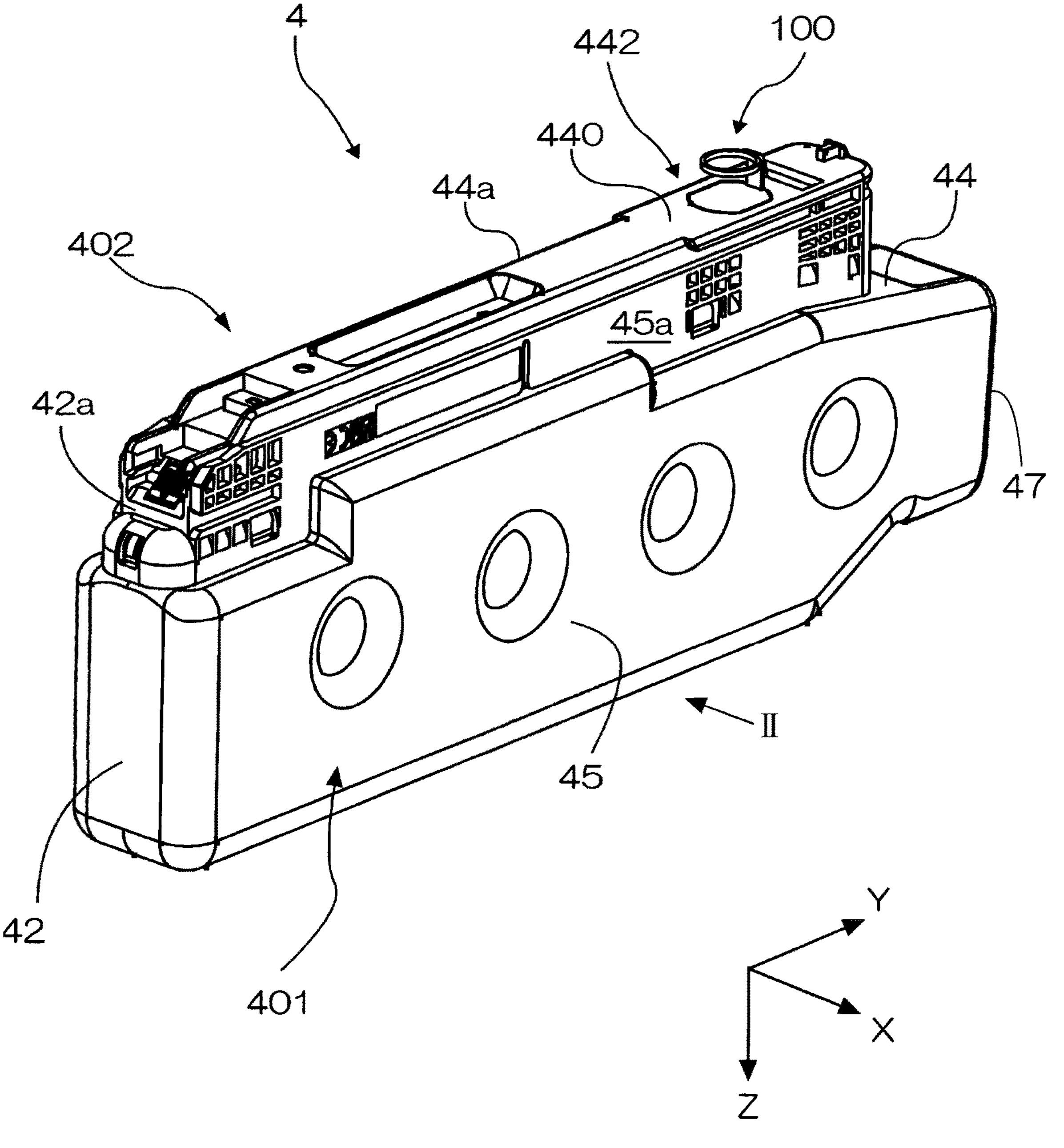
FIG. 1 is a perspective view illustrating an external appearance of an ink cartridge according to an embodiment.

A. First Embodiment (A1) External Appearance Configuration of Ink Cartridge:

FIG. 1 is a perspective view illustrating an ink cartridge (hereinafter, also simply referred to as a cartridge) 4 used by being mounted to a printing machine to be described later. A printing machine to which the ink cartridge 4 is mounted and that is in a printable state is hereinafter referred to as a "printing apparatus". FIG. 1 depicts XYZ axes that are three spatial axes orthogonal to each other. The directions in which arrows of the X-axis, the Y-axis, and the Z-axis are oriented indicate positive directions along the X-axis, the Y-axis, and the Z-axis, respectively. Positive directions along the X-axis, the Y-axis, and the Z-axis are defined as a +X direction, a +Y direction, and a +Z direction, respectively. Directions opposite to the directions in which the X-axis, the Y-axis, and the Z-axis are oriented are negative directions along the X-axis, the Y-axis, and the Z-axis, respectively. Negative directions along the X-axis, the Y-axis, and the Z-axis are defined as a −X direction, a −Y direction, and a −Z direction, respectively. Directions along the X-axis, the Y-axis, and the Z-axis that do not require a distinction between positive and negative is referred to as an X direction, a Y direction, and a Z direction, respectively.

The cartridge 4 is mounted to a printing machine to be described later. In a use state of the printing machine, the X-axis and the Y-axis are axes along a horizontal plane, and the Z-axis is a vertical axis orthogonal to the horizontal plane. The configurations of the printing machine and the printing apparatus will be described in detail later as a printing machine 10 and a printing apparatus 90 with reference to FIG. 8 and the subsequent drawings. A vertically downward direction in which the ink in the cartridge 4 flows out in a state in which the cartridge 4 is mounted to the printing machine coincides with the −Z direction. FIG. 1 depicts the mounted cartridge 4 in a manner that the top and bottom of the cartridge 4 are reversed. Note that, in the present embodiment, the X direction is an arrangement direction of the cartridges 4 when a plurality of cartridges 4 are mounted to the printing machine, and the Y direction is a moving direction of the cartridges 4 when the cartridges 4 are mounted to and removed from the printing machine. The X-axis, the Y-axis, and the Z-axis indicating these directions are appropriately described in FIG. 2 and the subsequent drawings.

Figure 2:
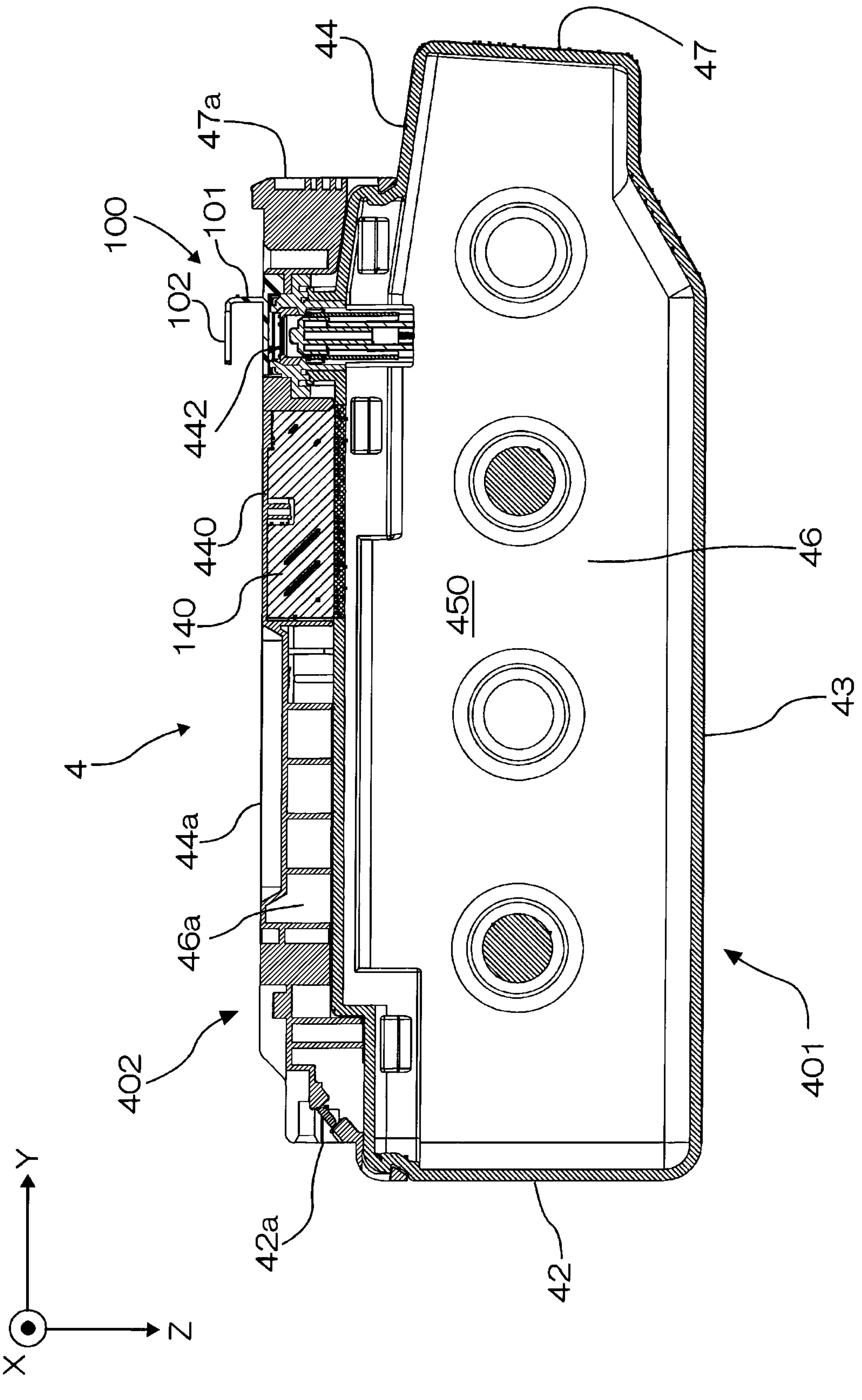
FIG. 2 is a sectional view of the ink cartridge taken along a Y-Z plane passing through the center in an X direction and viewed from the direction of arrow II in FIG. 1.

FIG. 2 is a sectional view taken along a Y-Z plane at the center in the X direction and viewed from the direction of arrow II. An outline of the structure of the cartridge 4 will be described below with reference to FIGS. 1 and 2. The cartridge 4 contains ink for printing and has a substantially rectangular parallelepiped shape whose longitudinal direction is the Y direction. The cartridge 4 roughly includes a liquid container 401 serving as a portion for containing ink and an adapter 402 having a function of exchanging ink and information with the printing machine.

The liquid container 401 has a substantially rectangular parallelepiped shape. The liquid container 401 includes, as an outer shell, six wall surfaces of a body front wall 42 provided on the −Y direction side, a body rear wall 47 on the opposite side of the body front wall 42, a first body side wall 45 and a second body side wall 46 that couple the body front wall 42 and the body rear wall 47 on both sides in the X direction, a body upper wall 43 provided on the Z direction side in the drawing, and a body bottom wall 44 to which the adapter 402 is attached. The second body side wall 46 is illustrated as the inner side of the liquid container 401 in FIG. 2. A liquid containing portion 450 that contains ink is formed by being surrounded by these wall surfaces 42 to 47.

The adapter 402 has a substantially rectangular parallelepiped shape and has a shape surrounded by substantially six wall surfaces, similarly to the liquid container 401. Wall surfaces **42*a* to 47*a* respectively correspond to the wall surfaces 42 to 47 of the liquid container 401. Both wall surfaces in the Y direction are the adapter front wall 42*a* and the adapter rear wall 47*a*, both wall surfaces in the X direction are the first side wall 45*a* and the second side wall 46*a*, and both wall surfaces in the Z direction are the adapter bottom wall 44*a* and an adapter upper wall. The adapter 402 is coupled to a bottom wall body 440 that is a bottom wall forming an opening portion through which an ink introduction portion of a printing machine to be described later is inserted. For this reason, the reference numeral of the adapter upper wall is not illustrated. A liquid supply portion 442 is formed at the bottom wall body 440, and a sealing portion 100 is provided at a position covering the liquid supply portion 442. In addition to these, the adapter 402** further includes an electrode for communicating with the printing machine side, but the description thereof will be omitted.

Figure 3:
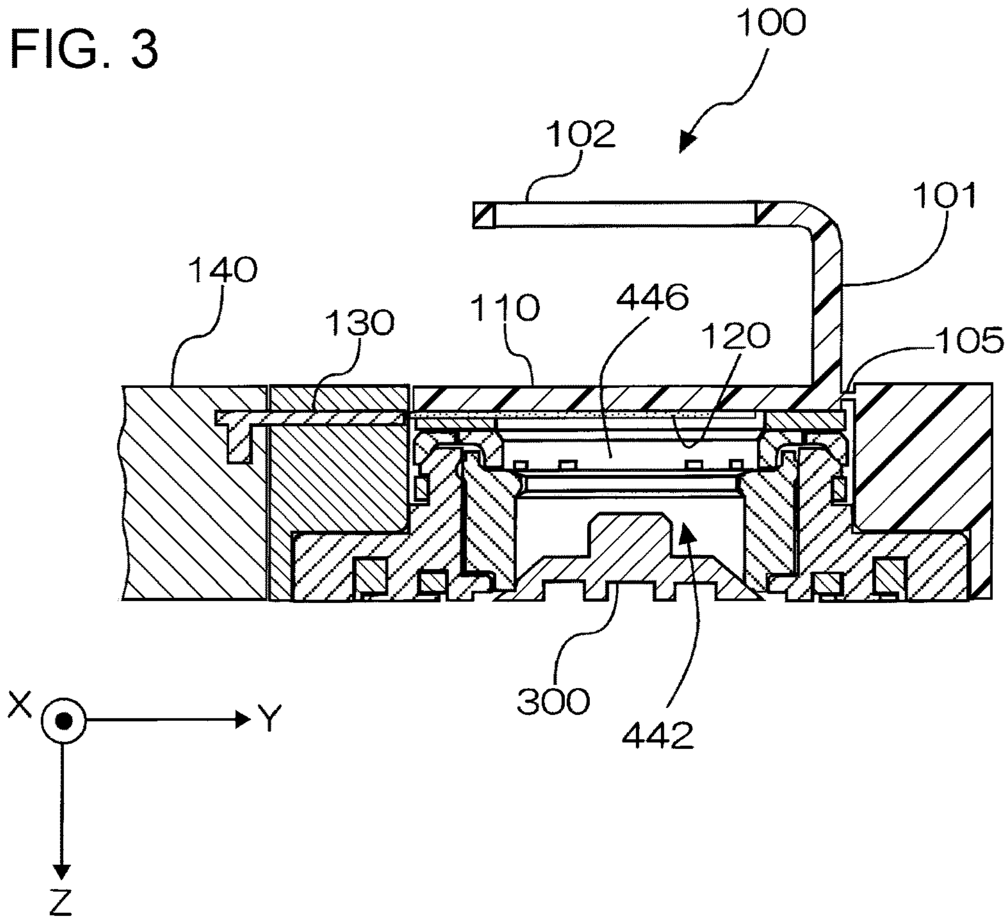
FIG. 3 is an explanatory view illustrating enlarged sectional shapes of a liquid supply portion and a sealing portion of the ink cartridge.

(A2) Configuration of Liquid Supply Portion and Sealing Portion:

The configurations of the liquid supply portion 442 and the sealing portion 100 provided at the bottom wall body 440 of the adapter 402 are illustrated in FIG. 3 in an enlarged manner. A perspective view of a state in which the sealing portion 100 is attached to the upper portion of the liquid supply portion 442 is illustrated as FIG. 4. As illustrated in both drawings, the liquid supply portion 442 includes a valve 300 at a bottom wall opening portion 446 provided at the bottom wall body 440 of the adapter 402. The valve 300 closes the bottom wall opening portion 446. The valve 300 is urged in the −Z direction by an elastic member such as a spring (not illustrated). In the cartridge 4 alone, the valve 300 is maintained in a closed state. The sealing portion 100 is provided at a position covering the liquid supply portion 442 in the bottom wall body 440.

Figure 4:
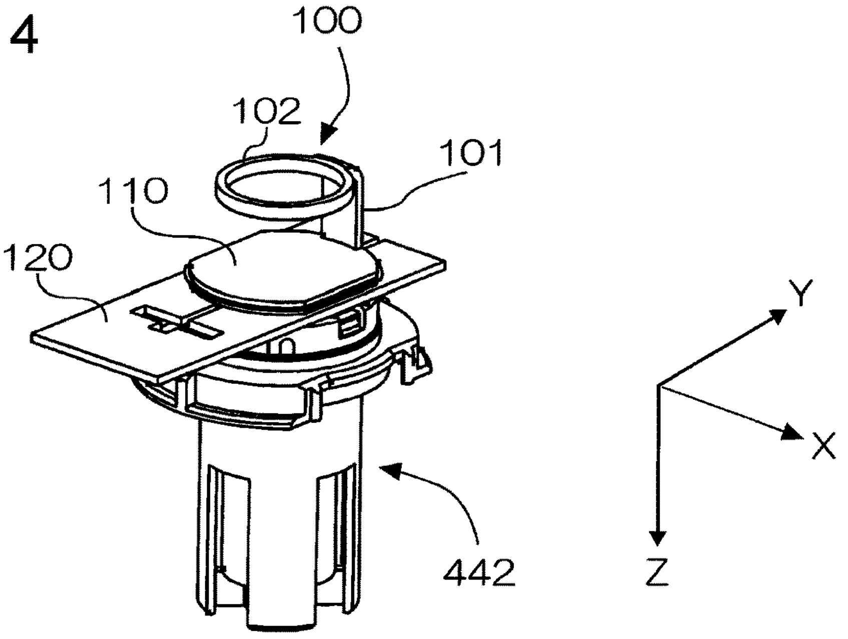
FIG. 4 is a perspective view illustrating an external appearance of the liquid supply portion and the sealing portion of the ink cartridge.

The sealing portion 100 includes a sealing body portion 110 and a protruding portion formed from the sealing body portion 110 toward the −Z direction. The protruding portion includes a coupling portion 101 as a first formation portion formed outward from a position on the periphery of the sealing body portion 110, and a tab portion 102 having an annular shape as a second formation portion formed in a direction crossing the coupling portion 101. An ink holding portion 120 is provided on the back surface of the sealing body portion 110, that is, on the liquid supply portion 442 side. The inner diameter of the tab portion 102 having an annular shape in the sealing portion 100 has a dimension that allows a user to hook his or her normal-sized finger thereon. The sealing body portion 110 is resin-formed integrally with the bottom wall body 440. However, although one end of the sealing body portion 110 on the coupling portion 101 side is coupled to the bottom wall body 440 at a thin portion 105, the outer periphery of the sealing body portion 110 is separated from the bottom wall body 440 except for the thin portion 105. In FIG. 4, placing priority on ease of viewing, illustration of the bottom wall body 440 surrounding the sealing body portion 110 is omitted.

The ink holding portion 120 is a member that holds liquid when ink as liquid contained in the liquid containing portion 450 leaks from an outflow opening portion 432 of the liquid supply portion 442. In the present embodiment, the ink holding portion 120 is integrally formed with the back surface of the sealing body portion 110. Furthermore, a capillary flow path member 130 that guides ink from the ink holding portion 120 to an ink adsorbent 140 provided at the adapter 402 is also provided. The shape and function of the ink holding portion 120 will be collectively described later.

In the cartridge 4 of the present embodiment, when the tab portion 102 of the sealing portion 100 is pinched by fingers and pulled in a direction away from the cartridge 4, the force is transmitted to the thin portion 105 via the coupling portion 101, the thin portion 105 is broken, and the entire sealing portion 100 is separated from the bottom wall body 440. That is, the sealing portion 100 is separated by a user who intends to use the cartridge 4 intentionally attempting to separate the sealing portion 100, and once separated, the sealing portion 100 does not remain at the original position. When the sealing portion 100 is separated from the bottom wall body 440, the sealing body portion 110 is also separated together, and thus the liquid supply portion 442 provided at the bottom wall body 440 of the adapter 402 becomes visible from the outside.

Figure 5:
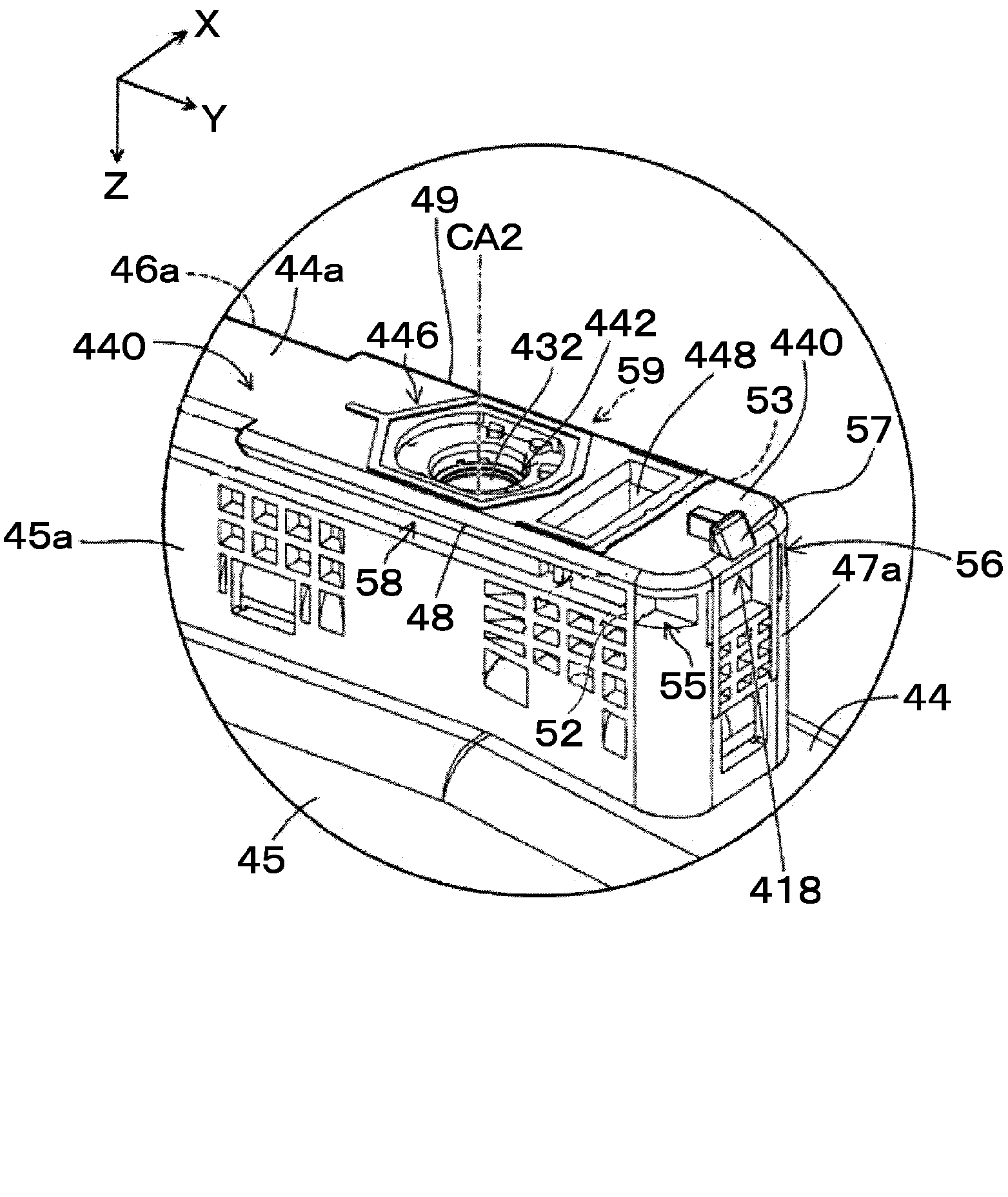
FIG. 5 is an explanatory view illustrating the periphery of the liquid supply portion in an enlarged manner.

FIG. 5 illustrates a shape around the liquid supply portion 442 that is exposed as a result of separating the sealing portion 100. FIG. 5 is an enlarged view illustrating a state in which the periphery of the liquid supply portion 442 is viewed from the first side wall **45*a* side. As already described, the adapter 402 has a substantially rectangular parallelepiped shape and includes the outer shell, such as the adapter rear wall 47*a*, the first side wall 45*a*, the second side wall 46*a*, and the adapter bottom wall 44*a***. Note that, in FIG.

5, illustration of the adapter front wall is omitted. The adapter bottom wall 44*a* includes the bottom wall body 440 that forms the bottom wall of the entire cartridge 4, and the bottom wall opening portion 446. The bottom wall body 440 is provided with a cartridge-side supply portion positioning portion 448 that positions the cartridge 4 with respect to the cartridge mounting portion 6. The function of the cartridge-side supply portion positioning portion 448 will be described later.

The liquid supply portion 442 provided in the space surrounded by the outer shell causes the contained liquid to flow to the outside in a state in which the cartridge 4 is mounted on the printing machine. Specifically, the liquid supply portion 442 is a member for supplying the liquid (here, ink) contained in the liquid containing portion 450 to the outside. The liquid supply portion 442 includes the outflow opening portion 432 for allowing the liquid to flow to the outside at the bottom wall opening portion 446. The liquid supply portion 442 communicates with the liquid containing portion 450 via the outflow opening portion 432. The liquid supply portion 442 has a supply portion-side central axis CA2. The liquid supply portion 442 is a tubular member that protrudes from the body bottom wall 44 toward the adapter 402 and extends along the supply portion-side central axis CA2. In the present embodiment, the supply portion-side central axis CA2 is an axis along the Z-axis. That is, in the present embodiment, the Z direction is a direction along the liquid supply portion 442.

As illustrated in FIG. 5, the bottom wall opening portion 446 exposes the outflow opening portion 432. The bottom wall opening portion 446 is a hole formed so as to pass through the inner surface and the outer surface of the adapter bottom wall 44*a*. The liquid supply portion 442 is disposed such that the supply portion-side central axis CA2 passes through the bottom wall opening portion 446.

In the cartridge 4 of the present embodiment, the liquid supply portion 442 is covered with the sealing portion 100. The sealing portion 100 is intentionally separated to expose the bottom wall opening portion 446 in which the liquid supply portion 442 is accommodated. The cartridge 4 is mounted to the printing machine in a state in which the sealing portion 100 is separated, but the cartridge 4 may be removed from the printing machine while ink remains in the liquid containing portion 450. Accordingly, a configuration is adopted in which the cartridge 4 can be returned to a state in which the bottom wall opening portion 446 is not exposed to the outside by fitting a cap (not illustrated) to the bottom wall body 440. To this end, as members for positioning and attaching the cap with respect to the cartridge 4, the adapter 402 includes a cartridge-side arrangement determination portion 57, a pair of guide ribs 48 and 49, a pair of recessed portions 58 and 59, a pair of square hole portions 55 and 56, and a pair of cartridge-side regulation portions 52 and 53. Description of these members will be omitted.

Figure 6:
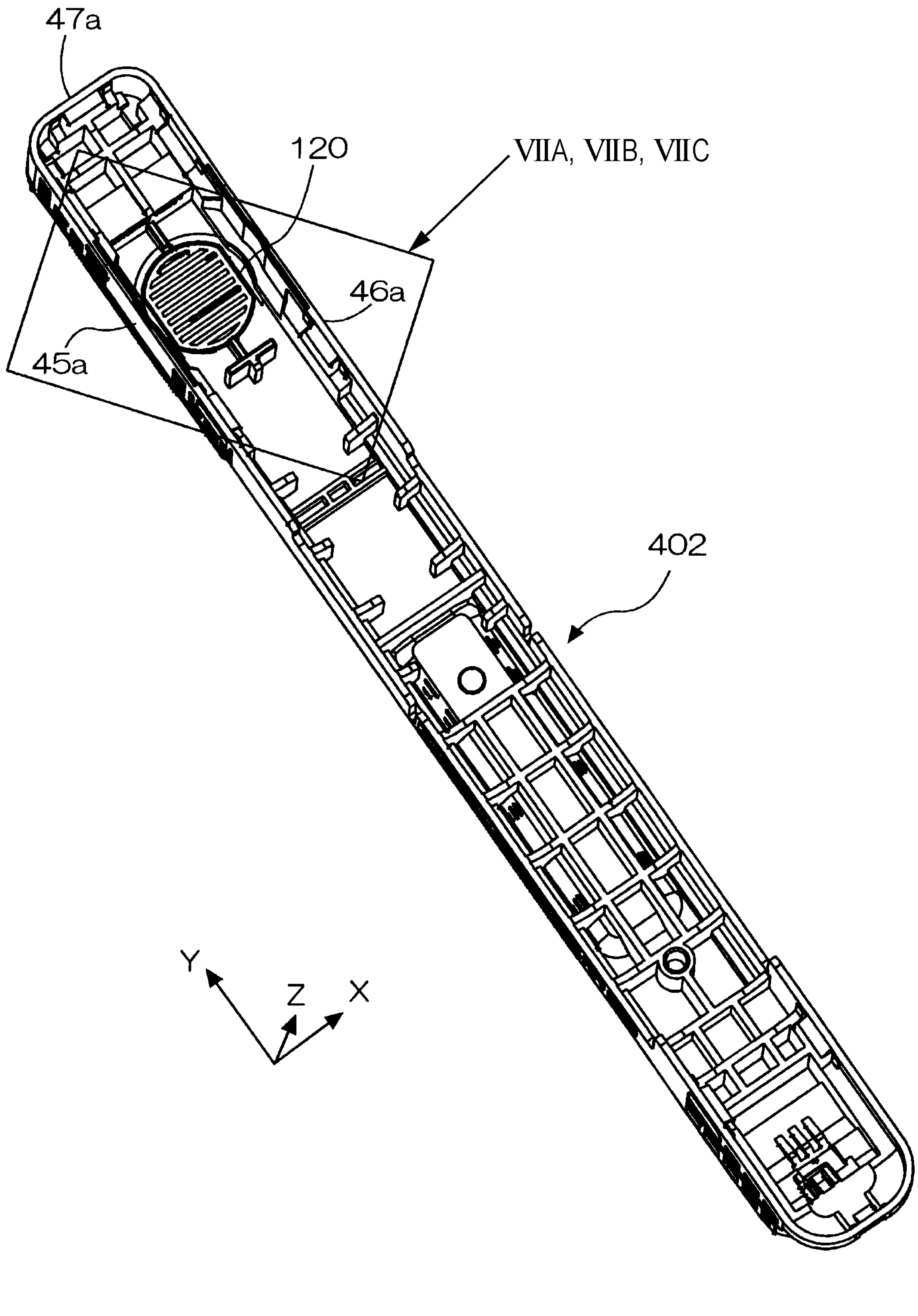
FIG. 6 is an explanatory view of a bottom wall body of the ink cartridge as viewed from inside.
Figure 7A:
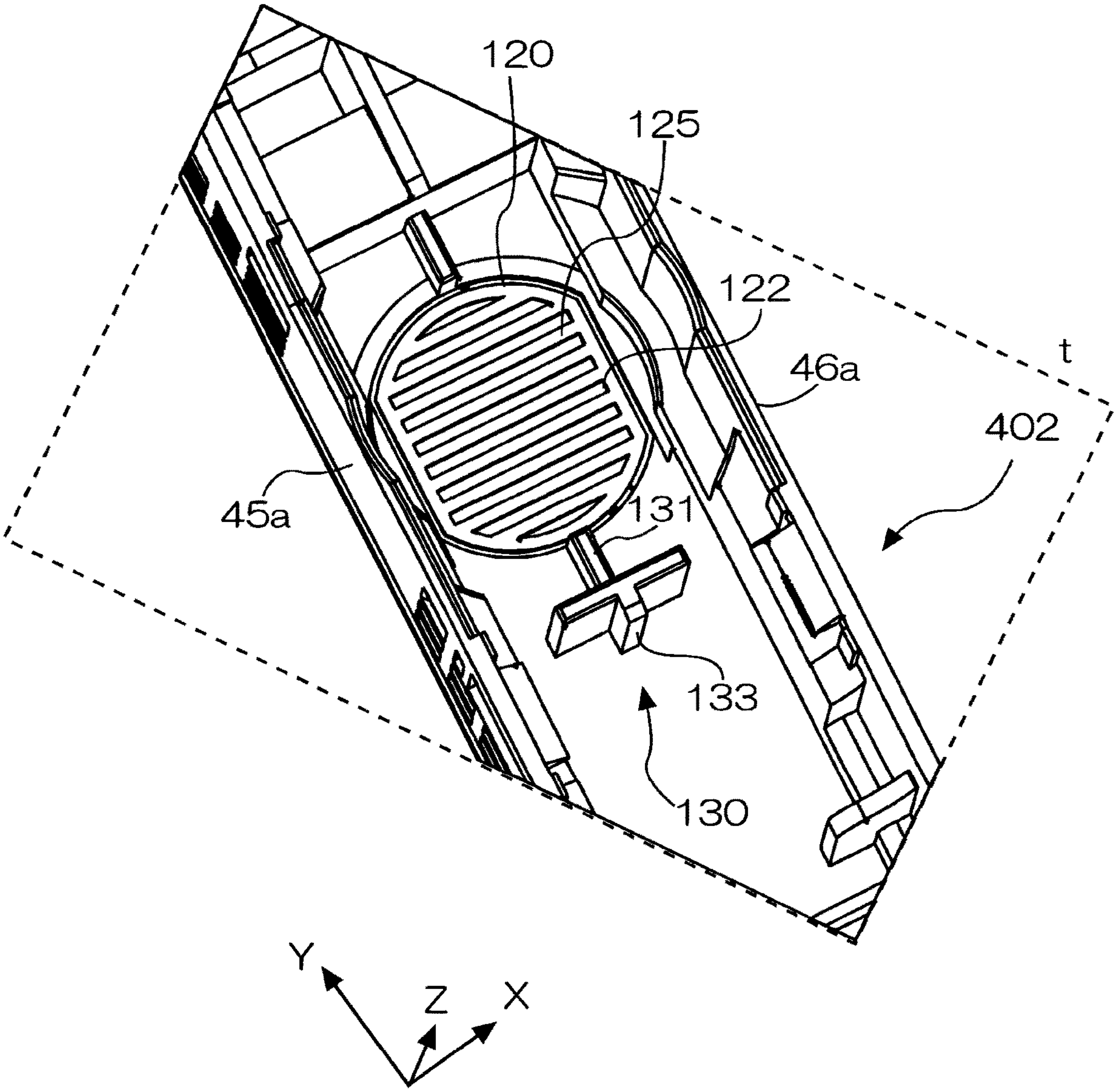
FIG. 7A is an explanatory view illustrating a back surface shape of the sealing portion by enlarging a portion VIIA of FIG. 6.

(A3) Structure and Function of Ink Holding Portion:

As illustrated in FIG. 3, the ink holding portion 120 is provided on the back surface of the sealing body portion 110 of the sealing portion 100. An example of the ink holding portion 120 is illustrated in FIG. 6. FIG. 6 is a perspective view of the adapter 402 as viewed from inside. FIG. 7A is an explanatory view illustrating a portion VIIA in FIG. 6 in an enlarged manner. In this example, the outer shape of the ink holding portion 120 is the same as that of the sealing body portion 110, and on the surface of the ink holding portion 120, a plurality of fine ridges 122 extending in the X direction are arranged in the Y direction at small intervals. Since the ridges 122 are independent of each other, thin groove portions 125 coupled to each other are formed between the ridges 122. The groove portion 125 has a width, a size (narrowness) of which allows a significant capillary force to be exerted on the ink contained in the liquid containing portion 450.

The capillary flow path member 130 is provided at one end of the groove portion 125. The capillary flow path member 130 includes a capillary flow path 131 for guiding the ink held by the ink holding portion 120 to the outside and a capillary adsorption portion 133 for allowing the guided ink to be adsorbed by the ink adsorbent 140. The ink adsorbent 140 is made of a continuous porous material (trade name: AION PVA Sponge) using a PVA sponge. The ink adsorbent 140 used in the present embodiment has an average pore diameter of substantially 130 μm and a porosity of substantially 90%. On the other hand, the groove portion 125 of the ink holding portion 120 has a width larger than 130 μm. As an example, the width is 200 μm. With this configuration, when the valve 300 of the liquid supply portion 442 is opened for some reason and ink leaks from the liquid supply portion 442 and reaches the sealing portion 100 side, the leaked ink is first held by the ink holding portion 120, specifically, by the groove portions 125, and spreads over the entire ink holding portion 120 by the capillary force of the groove portions 125. Therefore, ink can be held up to the holding amount of the entire ink holding portion 120 regardless of the way of leakage from the liquid supply portion 442. Further, ink is sucked into the capillary flow path 131, which is a flow path narrower than the groove portion 125, and the capillary adsorption portion 133 side, and is finally adsorbed by the ink adsorbent 140. As described above, since the ink adsorbent 140 used in the present embodiment has a porosity of 90%, the ink adsorbent 140 can adsorb a large amount of ink. Since the flow path is narrower in the order of the groove portion 125, the capillary flow path 131, the capillary adsorption portion 133, and the ink adsorbent 140, a stronger capillary force is generated in this order. Thus, the ink having leaked from the liquid supply portion 442 is sucked to the ink adsorbent 140 side, and is adsorbed by the ink adsorbent 140 sooner or later.

Figure 7B:
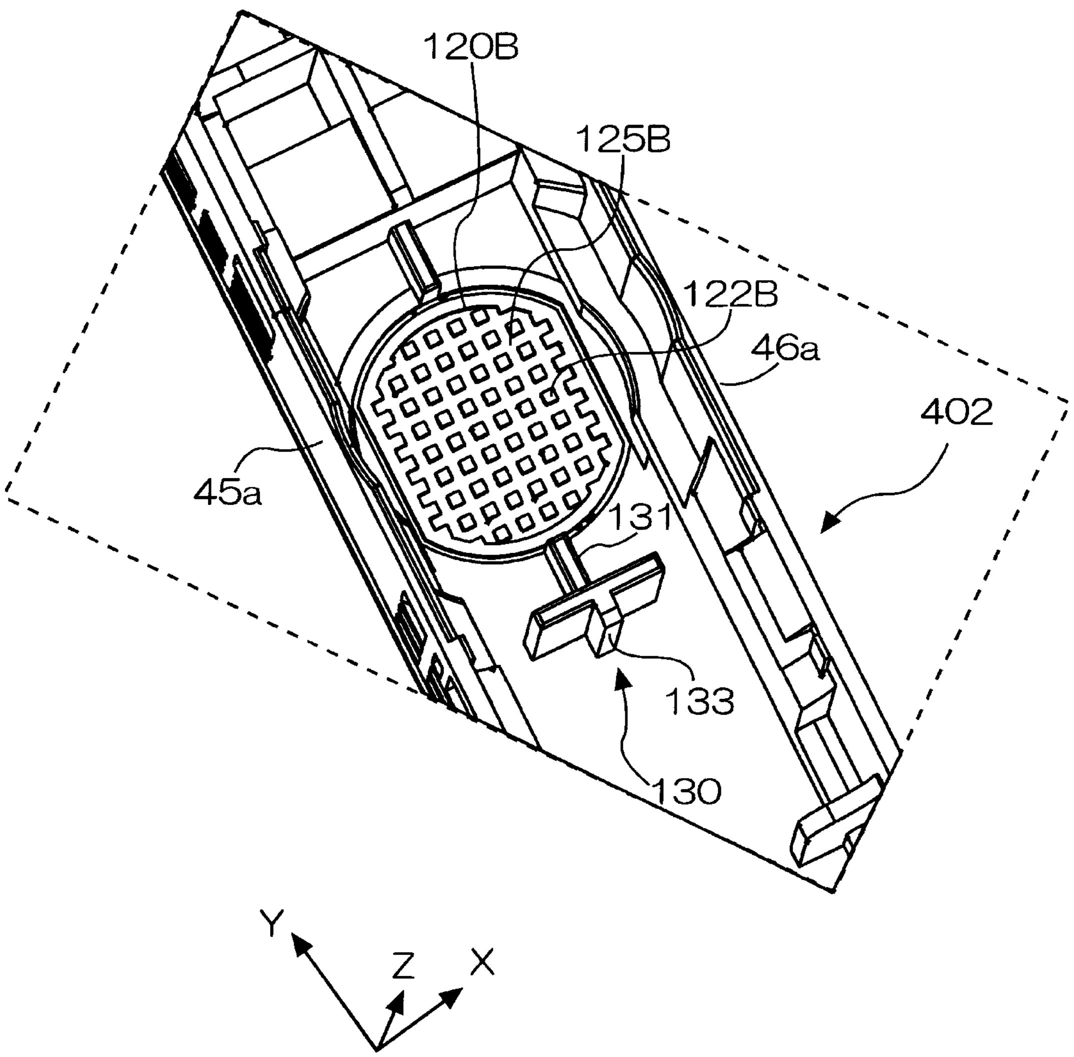
FIG. 7B is an explanatory view illustrating another example of the back surface shape of the sealing portion by enlarging a portion VIIB of FIG. 6.
Figure 7C:
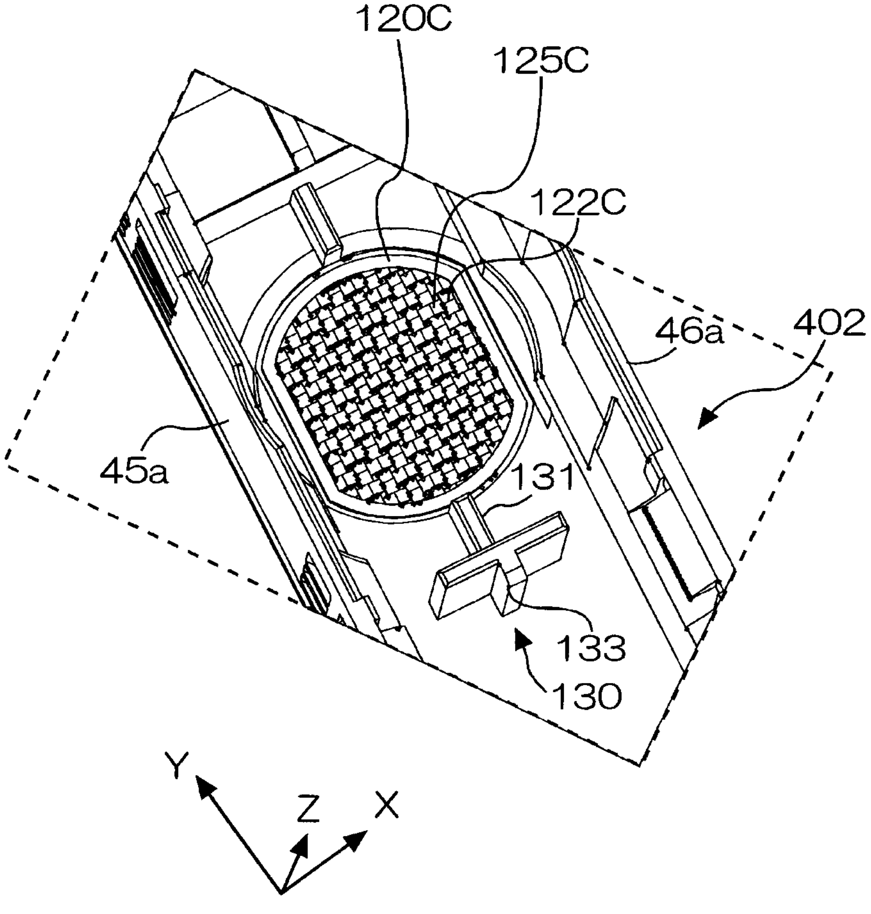
FIG. 7C is an explanatory view illustrating another example of the back surface shape of the sealing portion by enlarging a portion VIIC of FIG. 6.

FIGS. 7B and 7C illustrate other configuration examples of the ink holding portion 120. The ink holding portion 120B illustrated in FIG. 7B includes a large number of protruding portions 122B, instead of the ridges 122. These protruding portions 122*b* are independent of each other and are arranged at equal intervals in the X direction and the Y direction. Therefore, a groove portion 125B having an equal width is formed between the protruding portions 122B. This groove portion 125B is coupled to the capillary flow path member 130 as in the ink holding portion 120 illustrated in FIG. 7A. By configuring the ink holding portion 120B as described above and forming the width of the groove portion 125B to be small enough to hold ink by capillary force and larger than the average pore diameter of the ink adsorbent 140 as in the ink holding portion 120, ink having leaked from the liquid supply portion 442 can be held and finally adsorbed by the ink adsorbent 140.

The surface structure of the ink holding portion is not necessarily limited to the groove structure. For example, as illustrated in FIG. 7C, the surface structure of the ink holding portion may adopt a structure in which fibrous members 122C having a predetermined hardness cross each other longitudinally and transversely in an alternate manner. When the members 122C are longitudinally and transversely interlaced, these members 122C form a fine protrusion/recess structure on the surface of the ink holding portion

120C. This protrusion/recess structure accordingly exerts a capillary force on the ink adhering to the surface of the protrusion/recess structure, so that the ink is held and spread on the surface of the ink holding portion 120C. If the relationships with the width of the capillary flow path member 130 and the average pore diameter of the ink adsorbent 140 are set to be the same as those of the other ink holding portions 120 and 120B, the ink on the surface of the ink holding portion 120C can be adsorbed by the ink adsorbent 140.

Furthermore, in the above-described embodiment, all of the ink holding portions 120, 120B, and 120C are structures for holding the liquid by the capillary force, but it may be formed of a material having a property of absorbing the liquid, for example, a porous material formed of a synthetic resin such as polyvinyl alcohol. The capillary flow path member 130 and the ink adsorbent 140 may not be included. Further, the sealing portion 100 may not include the ink holding portion 120 and the like.

The structure of the cartridge 4, the structure of the sealing portion 100 provided at the cartridge 4, and the structures and functions of the ink holding portions 120, 120B, and 120C have been described above. This cartridge 4 may be transported alone after ink is contained in the liquid containing portion 450, and the operations and effects of including the sealing portion 100 can also be obtained in the cartridge 4. However, this cartridge 4 is finally mounted to a printing machine and used. In view of this, hereinafter, a printing machine to which the cartridge 4 is attached, an attachment relationship between the cartridge 4 and the printing machine, and the like will be described.

Figure 8:
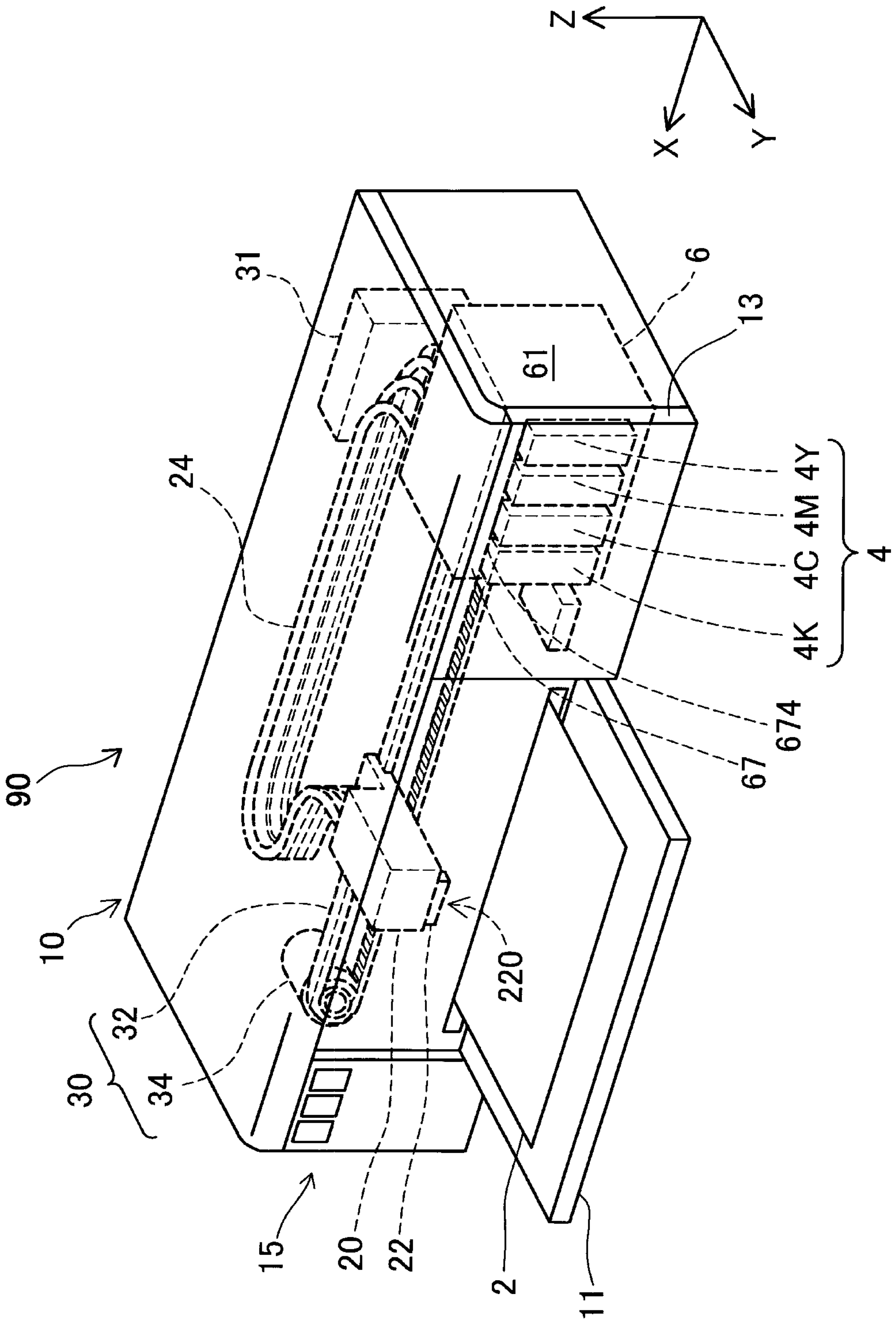
FIG. 8 is a perspective view illustrating a schematic configuration of a printing system.

(A4) Overall Configuration of Printing Machine:

FIG. 8 illustrates an example of a configuration of the printing apparatus 90 including the above-described cartridge 4 and the printing machine 10 to which the cartridge 4 is mounted. In the present embodiment, the printing apparatus 90 is an ink jet printer that discharges ink as liquid from a discharge head 22. The printing machine 10 includes a cartridge mounting portion 6, a control portion 31, a carriage 20, the discharge head 22, and a drive mechanism 30. The printing machine 10 also includes operation buttons 15 for a user to operate the printing machine 10.

The cartridge mounting portion 6 includes a first apparatus wall 67 positioned on the +Y direction side. The first apparatus wall 67 includes an insertion/extraction opening portion 674 serving as an entrance/exit where the cartridge 4 enters/exits an accommodation compartment 61. The cartridge 4 is accommodated in or removed from the accommodation compartment 61 of the cartridge mounting portion 6 through the insertion/extraction opening portion 674. In the present embodiment, an insertion direction D1 in which the cartridge 4 is inserted into the cartridge mounting portion 6 for mounting is the −Y direction. A removal direction D4 in which the cartridge 4 is removed from the cartridge mounting portion 6 is the +Y direction. Accordingly, in the cartridge mounting portion 6, the −Y direction side is also referred to as a far side, and the +Y direction side is also referred to as a near side.

One or more cartridges 4 are detachably mounted to the cartridge mounting portion 6. In the present embodiment, four types of the cartridges 4 corresponding to four color inks of black, cyan, magenta, and yellow, that is, a total of four cartridges 4 are mounted to the cartridge mounting portion 6. The cartridge 4 containing the black ink is also referred to as a first cartridge 4K, and the cartridge 4 containing the cyan ink is also referred to as a second cartridge 4C. The cartridge 4 containing the magenta ink is also referred to as a third cartridge 4M, and the cartridge 4 containing the yellow ink is also referred to as a fourth cartridge 4Y. In the present embodiment, the arrangement direction of the plurality of cartridges 4K, 4C, 4M, and 4Y is the X direction. Note that the type and the number of the cartridges 4 that can be accommodated in the accommodation compartment 61 of the cartridge mounting portion 6 are not limited thereto.

The printing machine 10 includes a cover 13 used in replacement on the front surface on the +Y direction side. The cover 13 used in replacement is openable/closable. When the cover 13 used in replacement is opened, the opening of the cartridge mounting portion 6 appears, and the cartridge 4 can be mounted and demounted. When the cartridge 4 is mounted on the cartridge mounting portion 6, ink is supplied to the discharge head 22 provided at the carriage 20 via a tube 24 as a liquid flow tube through which ink flows. Specifically, ink is supplied to the discharge head 22 by a water head difference between the ink liquid surface in the cartridge mounting portion 6 and the discharge head 22. Note that, in other embodiments, ink may be supplied to the discharge head 22 by sucking the ink in the cartridge 4 by a pump mechanism (not illustrated) of the printing machine 10.

The discharge head 22 includes nozzles 220 for each type of ink. The discharge head 22 discharges ink from the nozzles 220 toward a printing sheet 2 to print data such as characters and images. In the present embodiment, the printing machine 10 is a so-called "off-carriage type" printer in which the cartridge mounting portion 6 do not operate in conjunction with the movement of the carriage 20. On the other hand, the technology of the present disclosure can also be applied to a so-called "on-carriage type" printer in which the cartridge mounting portion 6 is provided at the carriage 20 and the cartridge mounting portion 6 moves together with the carriage 20.

The control portion 31 controls each portion of the printing machine 10 and transmits and receives signals to and from the cartridge 4. The carriage 20 moves the discharge head 22 relative to the printing sheet 2.

The drive mechanism 30 reciprocates the carriage 20 based on a control signal from the control portion 31. The drive mechanism 30 includes a timing belt 32 and a drive motor 34. By transmitting the power of the drive motor 34 to the carriage 20 via the timing belt 32, the carriage 20 reciprocates in the main scanning direction that is a direction along the X direction. The printing machine 10 also includes a transport mechanism for moving the printing sheet 2 in the sub-scanning direction. When printing is performed, the printing sheet 2 is moved in the sub-scanning direction as the +Y direction by the transport mechanism, and the printing sheet 2 after printing is completed is output onto the front cover 11.

Figure 9:
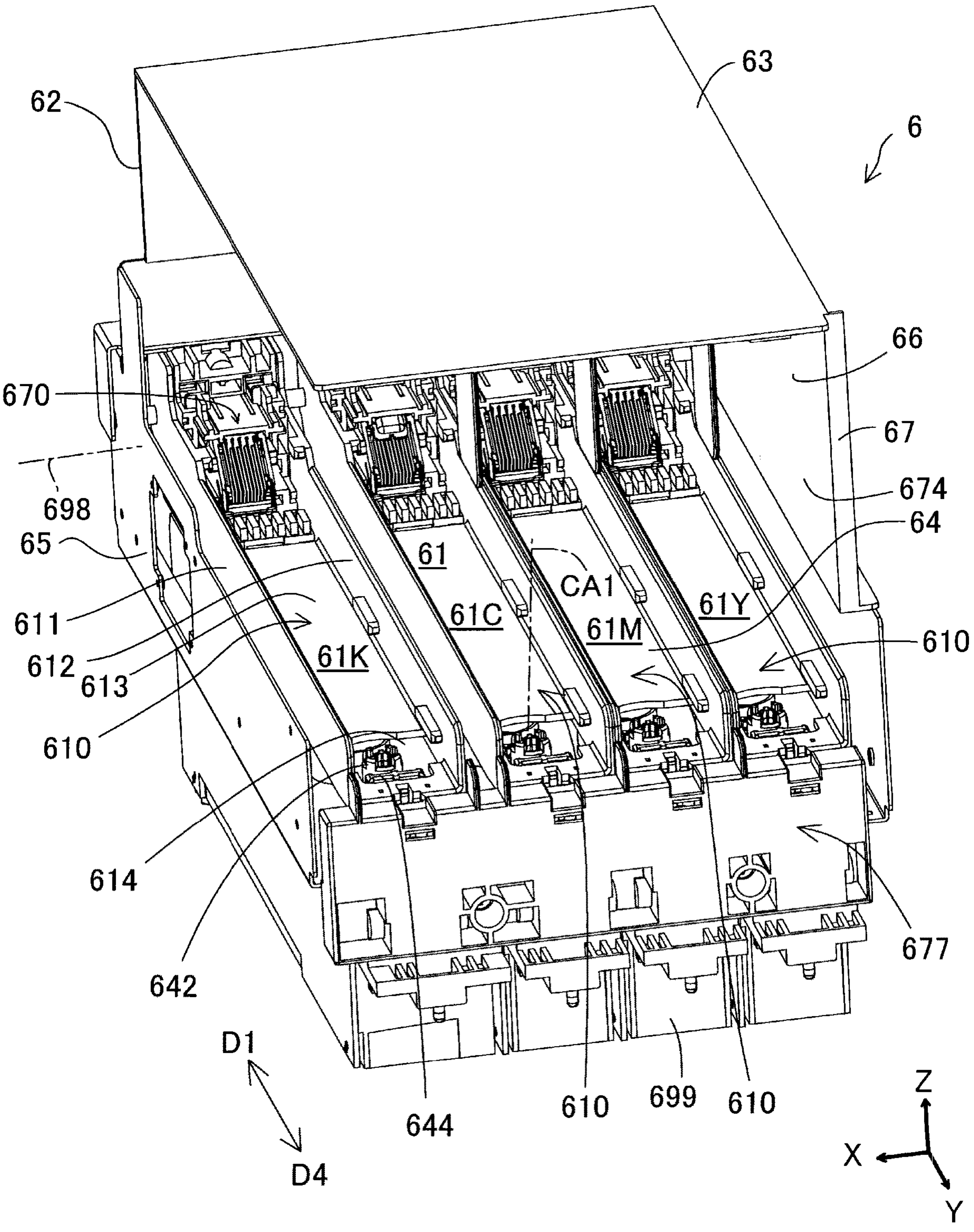
FIG. 9 is a perspective view of a cartridge mounting portion.
Figure 10:
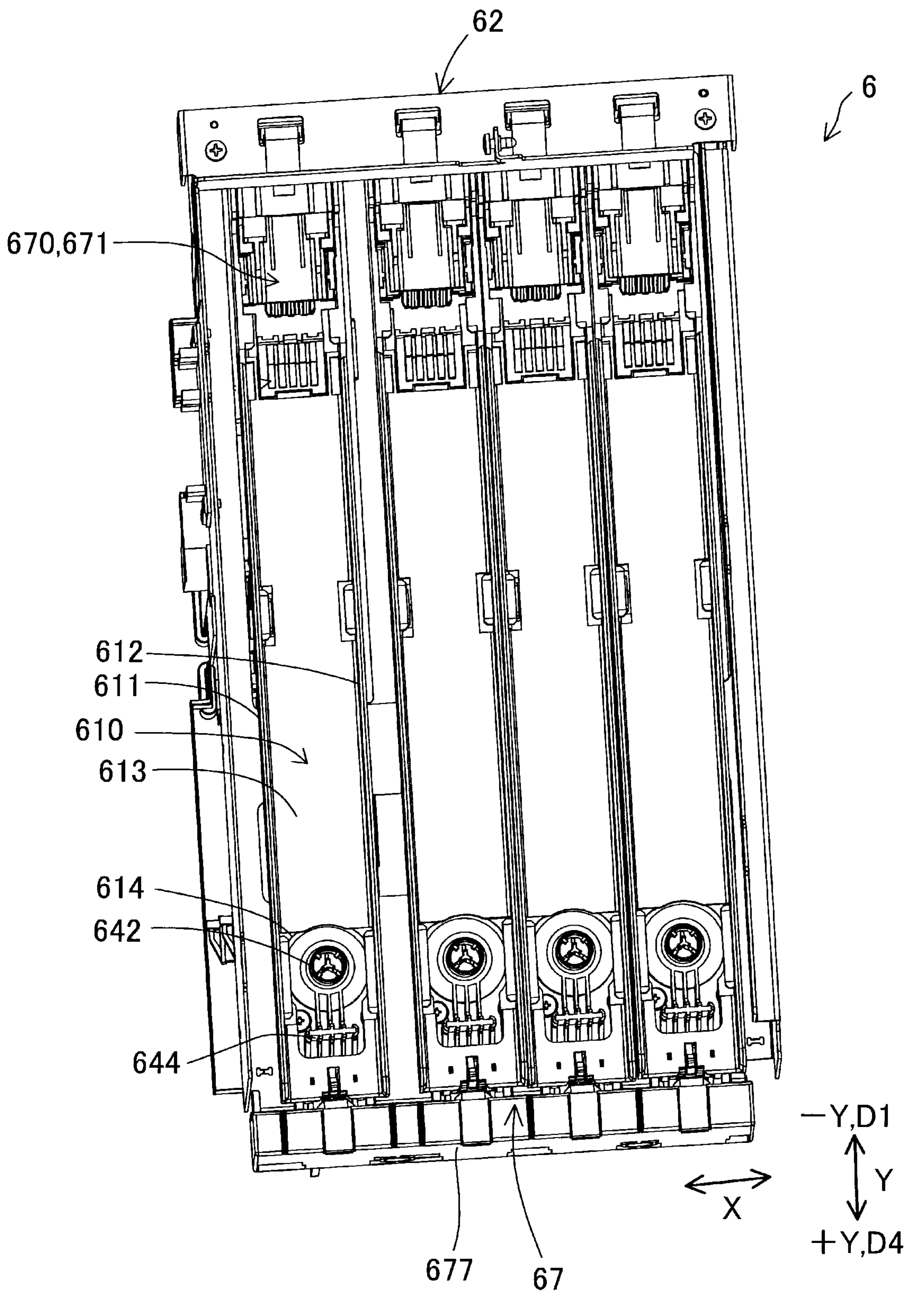
FIG. 10 is a view of the cartridge mounting portion as viewed from a +Z direction side.

(A5) Detailed Configuration of Cartridge Mounting Portion:

FIG. 9 is a perspective view of the cartridge mounting portion 6. FIG. 10 is a view of the cartridge mounting portion 6 as viewed from the +Z direction side. In FIGS. 9 and 10, for ease of understanding, illustration of a part of the configuration of the cartridge mounting portion 6 is omitted. Regarding the cartridge mounting portion 6, the X direction is also referred to as a width direction, the Y direction is also referred to as a depth direction, and the Z direction is also referred to as a height direction. Hereinafter, when the state is not particularly described, each constituent element will be described on the assumption that the cartridge mounting portion 6 is in the initial arrangement state in which the cartridge 4 is not mounted to the cartridge mounting portion 6.

As illustrated in FIG. 9, the cartridge mounting portion 6 includes the accommodation compartment 61 in which the cartridge 4 is accommodated. In the present embodiment, the accommodation compartment 61 has a substantially rectangular parallelepiped shape. In the accommodation compartment 61, the shapes of slots 61K, 61C, 61M, and 61Y substantially correspond to the external appearance shapes of the respective cartridges 4K, 4Y, 4M, and 4C illustrated in FIG. 8. The slots 61K, 61C, 61M, and 61Y are portions for accommodating the respective cartridges 4K, 4Y, 4M, and 4C.

The cartridge mounting portion 6 includes six apparatus walls 62, 63, 64, 65, 66, and 67 that form the accommodation compartment 61. In the present disclosure, the "wall" is a concept that encompasses a wall constituted by a plurality of walls in addition to a single wall. The first apparatus wall 67 forms the insertion/extraction opening portion 674 allowing the cartridge 4 to pass therethrough upon being inserted into or removed from the accommodation compartment 61. The second apparatus wall 62 opposes the first apparatus wall 67 in the Y direction and forms a wall of the accommodation compartment 61 on the −Y direction side. The second apparatus wall 62 is a wall along the Z direction substantially perpendicular to a horizontal plane in the use state of the printing machine 10.

The apparatus upper wall 63 forms a wall on the +Z direction side of the accommodation compartment 61. The apparatus bottom wall 64 opposes the apparatus upper wall 63 in the Z direction and forms a wall on the −Z direction side of the accommodation compartment 61. The apparatus bottom wall 64 is formed by a support member 610. The apparatus bottom wall 64 includes an apparatus opening portion 614 formed for each of the slots 61K, 61C, 61M, and 61Y. In the present embodiment, four apparatus opening portions 614 are formed in accordance with the slots 61K, 61C, 61M, and 61Y. The apparatus upper wall 63 and the apparatus bottom wall 64 cross the second apparatus wall 62 and the first apparatus wall 67. In the present disclosure, "intersect" or "cross" means any one of the following states (i) to (iii):

(i) A state in which two constituent elements cross each other and actually intersect;

(ii) A state in which if one constituent element is extended, the extended constituent element intersects the other constituent element; and (iii) A state in which if both the constituent elements are extended, the constituent elements intersect each other.

The first apparatus side wall 65 forms a wall on the +X direction side of the accommodation compartment 61. The second apparatus side wall 66 opposes the first apparatus side wall 65 in the X direction and forms a wall of the accommodation compartment 61 on the −X direction side. The first apparatus side wall 65 and the second apparatus side wall 66 each intersect the second apparatus wall 62, the first apparatus wall 67, the apparatus upper wall 63, and the apparatus bottom wall 64.

As illustrated in FIGS. 9 and 10, the cartridge mounting portion 6 further includes the support member 610, a liquid storage portion 699, a liquid introduction portion 642, an apparatus-side supply portion positioning portion 644, an apparatus-side terminal portion 670, and an engagement forming member 677.

A plurality of support members 610 are provided in accordance with the number of cartridges 4 to be mounted. In the present embodiment, the support member 610 supports the cartridge 4 from the −Z direction side that is the gravity direction side. The support member 610 is a recess-shaped member extending along the Y direction.

The support member 610 includes a main wall 613 that forms the apparatus bottom wall 64, a first support side wall 611, and a second support side wall 612. The main wall 613 forms a recess-shaped bottom portion positioned on the gravity direction side. The apparatus opening portion 614 is formed at an end portion of the main wall 613 on the first apparatus wall 67 side positioned on the +Y direction side. The apparatus opening portion 614 passes through the main wall 613 in the thickness direction of the main wall 613 that is a direction along the Z direction. The first support side wall 611 rises from the +X direction side of the main wall 613 in the +Z direction that is a direction opposite to the gravity direction. The second support side wall 612 rises from the −X direction side of the main wall 613 in the +Z direction that is a direction opposite to the gravity direction. The first support side wall 611 and the second support side wall 612 oppose each other in the X direction.

The liquid storage portion 699 receives the liquid of the cartridge 4. The liquid introduction portion 642 has an introduction portion-side central axis CA1.

As illustrated in FIG. 9, the apparatus-side supply portion positioning portion 644 regulates the movement of the liquid supply portion 442 of the cartridge 4 with respect to the liquid introduction portion 642 by being received by the cartridge-side supply portion positioning portion 448 illustrated in FIG. 12, which will be described later, of the cartridge 4. The apparatus-side supply portion positioning portion 644 is a projection having a substantially rectangular parallelepiped shape.

The apparatus-side terminal portion 670 is a mechanism provided for electrically coupling the cartridge 4 and the printing machine 10 in a state in which the cartridge 4 is mounted to the cartridge mounting portion 6. The apparatus-side terminal portion 670 includes an apparatus-side terminal 671 that comes into contact with a cartridge-side terminal 89 of the cartridge 4.

The engagement forming member 677 is formed on the first apparatus wall 67 side positioned further on the +Y direction side than the support member 610. The engagement forming member 677 is positioned further on the −Z direction side than the insertion/extraction opening portion 674. At the engagement forming member 677, four elastic mounting engagement portions (not illustrated) corresponding to the respective slots 61K, 61C, 61M, and 61Y are disposed.

Figure 11:
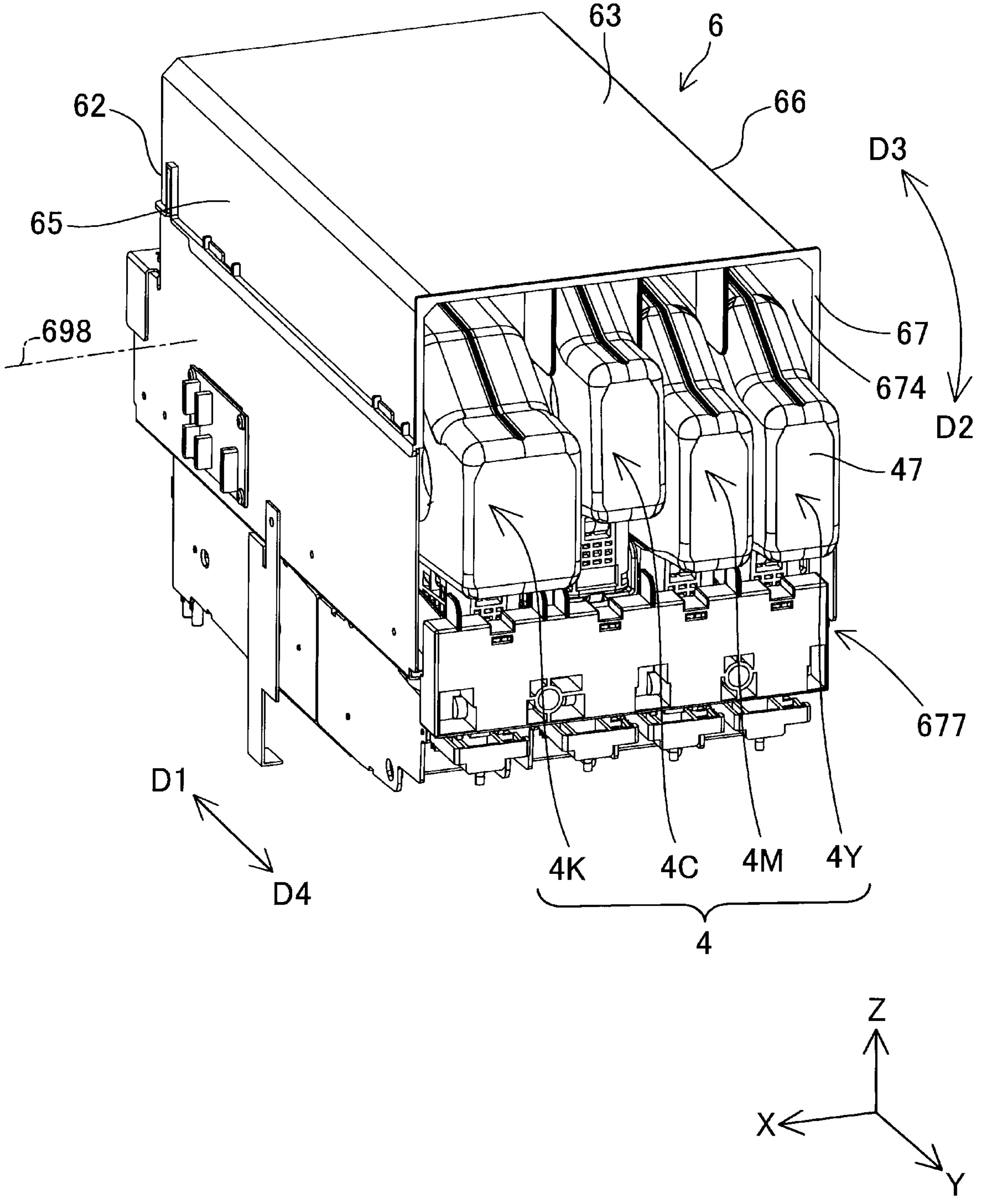
FIG. 11 is a view for explaining a process of mounting the cartridge to the cartridge mounting portion.

(A6) Process of Mounting Cartridge:

FIG. 11 is an explanatory view for explaining a process of mounting the cartridge 4 to the cartridge mounting portion 6. FIG. 11 illustrates the "mounting completion state" in which the mounting to the cartridge mounting portion 6 of the first cartridge 4K, the third cartridge 4M, and the fourth cartridge 4Y among the four types of the cartridges 4K, 4C, 4M, and 4Y is completed. The mounting completion state is a state in which the cartridge 4 is mounted to the cartridge mounting portion 6 and ink as liquid can be supplied to the printing machine 10. Before the cartridge 4 is mounted to the cartridge mounting portion 6, as described above, a user pinches the tab portion 102 of the sealing portion 100 and pulls the tab portion 102 in a direction away from the cartridge 4, thereby breaking the sealing portion 100 at the thin portion 105 and removing the sealing portion 100 from the cartridge 4. Accordingly, the sealing body portion 110 is also removed, and the bottom wall opening portion 446 of the liquid supply portion 442 provided at the bottom wall body 440 of the cartridge 4 is exposed to the outside. In this state, the cartridge 4 is mounted to the cartridge mounting portion 6. FIG. 11 illustrates an "insertion completion state" in which the insertion of the second cartridge 4C into the cartridge mounting portion 6 is completed. The insertion completion state is a state in which the cartridge 4 is inserted into the cartridge mounting portion 6, but the liquid supply portion 442 of the cartridge 4 and the liquid introduction portion 642 of the cartridge mounting portion 6 are not coupled to each other.

Figure 12:
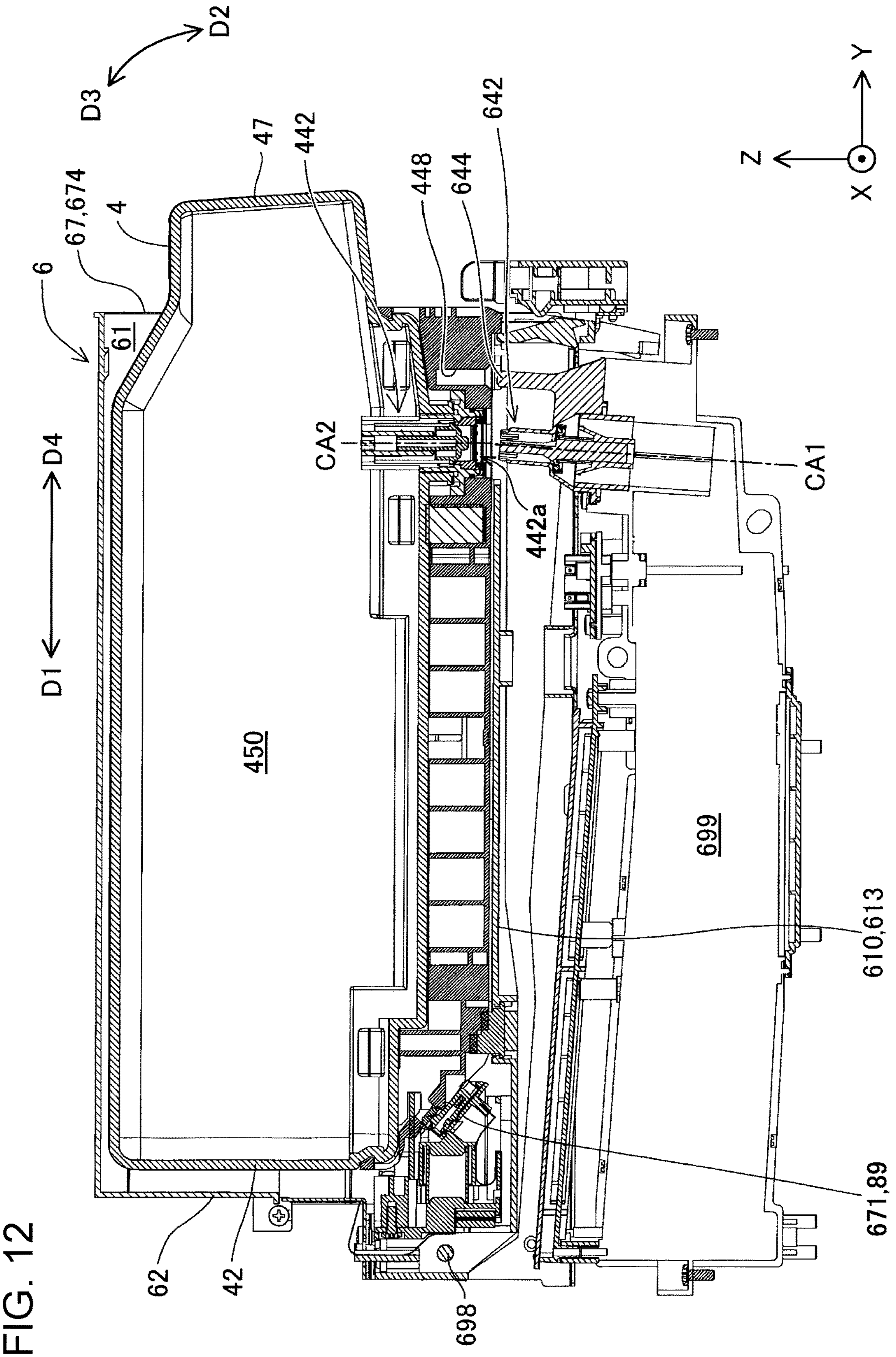
FIG. 12 is a sectional view illustrating the cartridge and the cartridge mounting portion in an insertion completion state.
Figure 13:
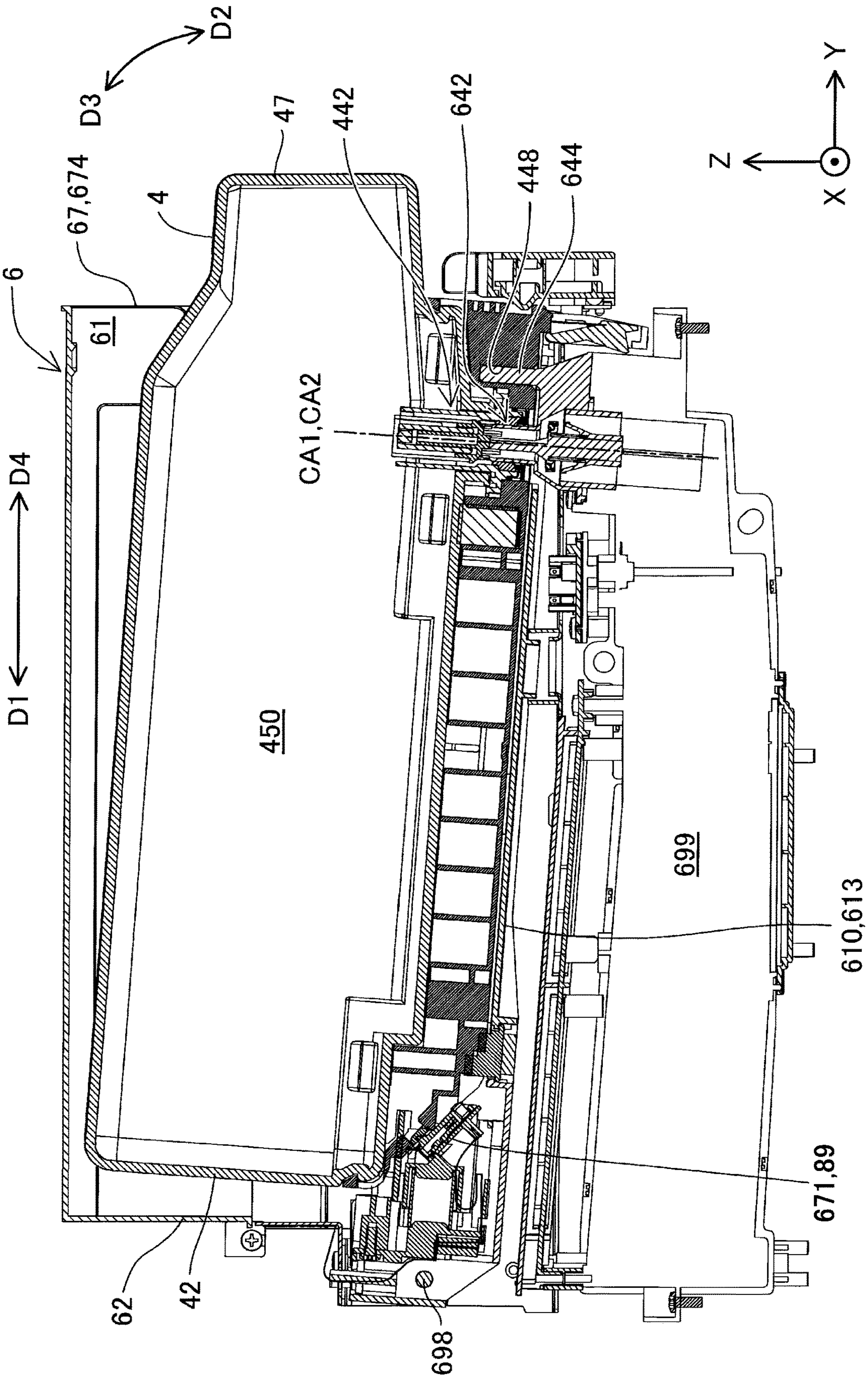
FIG. 13 is a sectional view illustrating the cartridge and the cartridge mounting portion in a mounting completion state.

FIG. 12 is a sectional view illustrating the cartridge 4 and the cartridge mounting portion 6 in the insertion completion state. FIG. 13 is a sectional view illustrating the cartridge 4 and the cartridge mounting portion 6 in the mounting completion state. Each of FIGS. 12 and 13 schematically illustrates a section taken along the Y-Z plane passing through the introduction portion-side central axis CA1.

As illustrated in FIGS. 11 and 12, the cartridge 4 is inserted to a predetermined position in the cartridge mounting portion 6 by moving in the insertion direction D1 along the horizontal direction. Thereafter, as illustrated in FIG. 13, the cartridge 4 is rotationally moved in a rotational mounting direction D2 having the −Z direction component with the far side in the insertion direction D1 of the cartridge mounting portion 6 as a rotation fulcrum 698, whereby the mounting of the cartridge 4 to the cartridge mounting portion 6 is completed. Specifically, when the cartridge 4 is mounted to the cartridge mounting portion 6, a mounting process is performed. The mounting process includes a terminal coupling process and a supply portion coupling process performed after the terminal coupling process.

As illustrated in FIG. 12, the terminal coupling process is a process of inserting the cartridge 4 to a predetermined position by moving the cartridge 4 in the −Y direction as the insertion direction D1 through the insertion/extraction opening portion 674 of the first apparatus wall 67 and inserting the cartridge 4 into the accommodation compartment 61 of the cartridge mounting portion 6. The predetermined position is a position at which the contact between the cartridge-side terminal 89 of the cartridge 4 and the apparatus-side terminal 671 of the cartridge mounting portion 6 is completed.

As illustrated in FIGS. 12 and 13, the supply portion coupling process is a process of coupling the liquid introduction portion 642 of the cartridge mounting portion 6 and the liquid supply portion 442 of the cartridge 4 while the contact between the apparatus-side terminal 671 and the cartridge-side terminal 89 is maintained. A detailed configuration of the cartridge 4, such as the liquid supply portion 442 will be described later. In the supply portion coupling process, the liquid introduction portion 642 and the liquid supply portion 442 are coupled to each other by rotationally moving the cartridge 4 on the body rear wall 47 side in the rotational mounting direction D2 indicated by the arrow around the rotation fulcrum 698 of the cartridge mounting portion 6. Note that, as illustrated in FIG. 11, the cartridge 4 is engaged by the engagement forming member 677 provided on the first apparatus wall 67 side of the cartridge mounting portion 6, whereby the mounting completion state is maintained.

As illustrated in FIGS. 12 and 13, when the cartridge 4 is taken out from the cartridge mounting portion 6, a user lifts the cartridge 4 on the body rear wall 47 side. As a result, the user rotationally moves, in an uncoupling direction D3, the cartridge 4 on the body front wall 42 side positioned opposite to the body rear wall 47 side in the Y direction. The uncoupling direction D3 is a direction opposite to the rotational mounting direction D2 with the rotation fulcrum 698 as a starting point. During this rotational movement, the engagement forming member 677 illustrated in FIG. 11 is disengaged. After the cartridge 4 is rotationally moved in the uncoupling direction D3 and the cartridge 4 enters the insertion completion state illustrated in FIG. 12, the cartridge 4 is moved in the +Y direction as the removal direction D4. With this process, the cartridge 4 is taken out from the cartridge mounting portion 6.

Figure 14:
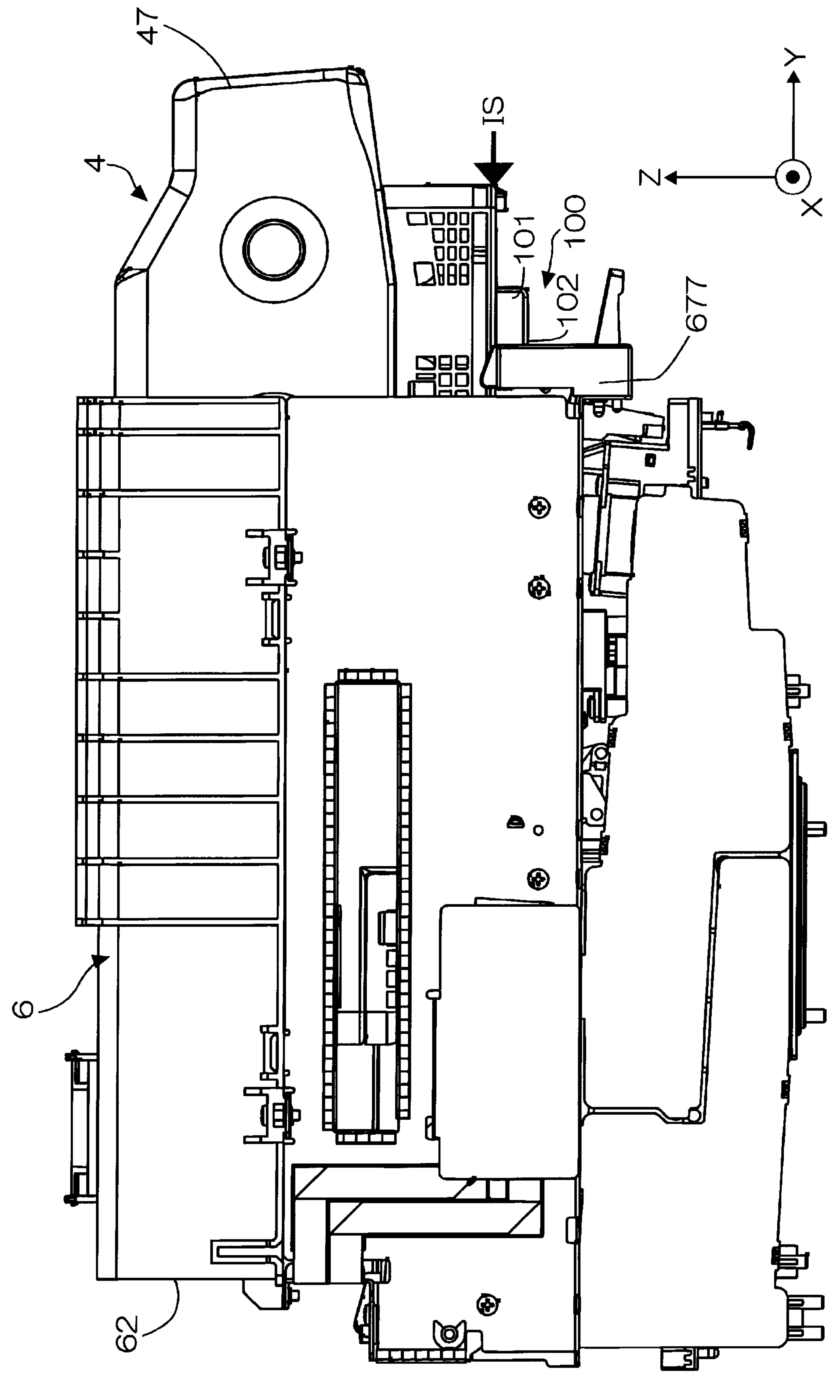
FIG. 14 is an explanatory view illustrating a state in which the ink cartridge with the sealing portion not being separated is attempted to be mounted.

In the above description, the sealing portion 100 is removed by a user before the cartridge 4 is mounted to the cartridge mounting portion 6. FIG. 14 illustrates an assumed case in which the cartridge 4 is attempted to be mounted to the cartridge mounting portion 6 without removing the sealing portion 100. In this case, the tab portion 102 of the sealing portion 100 protrudes from the bottom wall body 440 that is the outer surface of the adapter 402 of the cartridge 4 in the −Z direction by the height of the coupling portion 101. For this reason, when the cartridge 4 is inserted into the slot by moving the cartridge 4 in an arrow IS direction in order to mount the cartridge 4 to any one of the slots 61K, 61C, 61M, and 61Y of the cartridge mounting portion 6, the sealing portion 100 abuts against a part of the engagement forming member 677. Therefore, the cartridge 4 cannot be inserted any further. That is, unless the user removes the sealing portion 100 in advance, the cartridge 4 cannot be brought into the insertion completion state, and naturally, cannot be brought into the mounting completion state. Therefore, there is no possibility that, for example, the cartridge 4 is inserted with the film for sealing the liquid supply portion 442 having been forgotten to be peeled off, or the cartridge 4 is forcibly mounted with the film attached to the liquid supply portion 442 of the cartridge 4.

When the cartridge 4 is forcibly pushed in the direction of the arrow IS in the state illustrated in FIG. 14, the insertion of the cartridge 4 is prevented if the sealing portion 100 has a sufficient strength. On the other hand, if the attachment strength of the sealing portion 100 to the adapter 402 is low, it is considered that the sealing body portion 110 is broken from the thin portion 105 by the force of pushing the cartridge 4. Such an attachment method is not recommended, but in this case, the thin portion 105 and the coupling portion 101 are positioned on the rearmost end side when viewed from the insertion direction IS of the cartridge 4. Thus, the broken-off sealing portion 100 falls off to the outside of the cartridge mounting portion 6 in the printing machine 10 and is unlikely to remain inside the printing machine 10. Therefore, even if such a situation occurs, a failure due to the broken sealing portion 100 is less likely to occur.

(A7) Operations and Effects Obtained from the Embodiment:

In the cartridge 4 including the sealing portion 100 and the printing apparatus 90 in which the cartridge 4 is mounted to perform printing, both of which have been described above, ink can be prevented from evaporating or leaking from the liquid supply portion 442 during transportation of the cartridge 4 before use in a factory or delivery of the cartridge 4 before use in physical distribution processes. Since the sealing portion 100 used for this purpose can be formed at a time when the outer shell of the cartridge 4 is resin-molded, the number of necessary parts can be reduced. A film need not be attached for preventing ink leakage or the like, and the number of man-hours in manufacturing the cartridge 4 is not needlessly increased. Separation of the sealing portion 100 is easier than peeling-off of the film, and the liquid supply portion 442 of the cartridge 4 can be easily made available.

Further, since the film is not used in the cartridge 4 of the above-described embodiment, it is easy to adopt a configuration in which the cartridge 4 cannot be mounted to the printing machine 10 with the sealing portion 100 having been forgotten to be separated. Therefore, the printing apparatus 90 can avoid or reduce a risk caused by mounting the cartridge 4 to the cartridge mounting portion 6 of the printing machine 10 while the sealing portion 100 is not separated. Examples of assumed risks include ink leakage due to mounting of the abnormal cartridge 4, a coupling failure of the liquid supply portion 442, and contamination of an unnecessary substance, for example, a film piece, into ink. There are significant advantages in reducing or avoiding these risks.

Further, since the sealing portion 100 can be easily removed, a possibility of scattering ink at the time of removal can be reduced. By providing the ink holding portion 120 on the back side of the sealing body portion 110 of the sealing portion 100, that is, on the inner side of the adapter 402, ink attached to the ink holding portion 120 can be moved to the ink adsorbent 140 prepared at the cartridge 4 by using a difference in capillary force. Thus, the risk of ink scattering at the time of separating and removing the sealing portion 100 can be further reduced.

For these reasons, the film is not jammed in the printing apparatus 90, and it is easy to prevent a failure of the printing apparatus 90 and to make the printing apparatus 90 maintenance-free. For users of the printing apparatus 90, when the cartridge 4 is mounted to the printing machine 10, the film need not be peeled off, the liquid supply portion 442 of the cartridge 4 can be easily exposed, and the mounting work of the cartridge 4 is simplified.

B. Other Embodiments (1) The present disclosure can also be implemented in the following forms. Another embodiment is an aspect as an ink cartridge to be mounted to a printing machine including an ink introduction portion. The ink cartridge includes a containing portion configured to contain ink, a bottom wall being one of wall surfaces forming the ink cartridge, the bottom wall forming an opening portion through which the ink introduction portion is inserted, a sealing portion formed as a part of the bottom wall and having a shape configured to close the opening portion, a separation portion provided at a boundary between the sealing portion and the bottom wall, the separation portion being configured to make the sealing portion removable from the bottom wall, and an ink supply portion configured to supply the ink contained in the containing portion to the printing machine when the ink introduction portion is inserted through the opening portion exposed by removing the sealing portion from the bottom wall by the separation portion. With this configuration, since the sealing portion can be integrally formed, the manufacturing process of the cartridge can be simplified. Since the sealing portion can be separated by the separation portion, the opening portion through which the ink introduction portion is inserted can also be easily exposed. Once the sealing portion is separated, the sealing portion does not return to the state of sealing the opening portion. The ink contained in the ink cartridge may be any type and have any volume. For example, the ink may be aqueous ink, oil-based ink, dye-based ink, or pigment-based ink, and may have any color.

(2) In the above-described configuration, in the separation portion, a strength of a part of the bottom wall may be lower than a strength of a portion other than the separation portion. With this configuration, the sealing portion can be easily separated by the separation portion. The strength of a part of the bottom wall can be easily made lower than that of the portion other than the separation portion by techniques such as making a part of the separation portion thin, using a material having low strength for a part of the separation portion, and making a so-called perforation at the separation portion in advance. As long as the strength is made low in the direction in which the separation portion is separated, the strength may not be low in a direction different from the separation direction.

(3) In the above-described configurations according to (1) and (2), the sealing portion may include a protruding portion formed toward an outside of the bottom wall, and the protruding portion may configured as a tab with which the sealing portion is removed from the bottom wall in the separation portion by being moved to the outside of the bottom wall. This configuration further facilitates the separation of the sealing portion. The tab may have any shape as long as a user can easily pinch the tab. When the tab is separated using a jig, the tab may have any shape as long as the tab can be easily held by the jig.

(4) In the above-described configuration, the protruding portion may include a first formation portion formed toward the outside of the bottom wall from a position closer to a periphery than to a center of the sealing portion and a second formation portion formed in a direction crossing the first formation portion. With this configuration, the protruding portion can be easily pinched, and the sealing portion can be more easily separated.

(5) In the above-described configurations according to (1) to (4), an ink holding portion is further included on an opening portion side of the sealing portion. With this configuration, even if ink leaks from the ink supply portion in the state of the ink cartridge alone, the leaked ink is held by the ink holding portion and does not adhere to an unintended portion. This configuration can also reduce a possibility that ink leaks and an unexpected situation occurs when the sealing portion is separated. The ink holding portion may have a structure in which the ink holding portion simply holds ink when the ink adheres to the ink holding portion, and for example, the ink can be wiped off later. Alternatively, the ink holding portion may adsorb the ink as it is, or chemically solidified or decomposed the ink when the ink adheres to the ink holding portion.

(6) In the above-described configuration, the ink holding portion may be at least a part of an inner surface of the sealing portion on the opening portion side and may be a portion including an ink holding shape configured to generate a capillary force that has a predetermined magnitude or more and acts on the ink. With this configuration, the ink in contact with the ink holding portion is held by the ink holding portion due to the capillary force. The capillary force is a force that acts on ink through a narrow groove or hole due to the surface tension of ink. In this case, since the ink is only held, the ink can be transferred to another member or wiped off.

(7) In the above-described configuration, the ink holding shape may be one of a shape including a plurality of grooves formed in one direction, a shape obtained by combining a plurality of grooves formed in different directions, and a shape obtained by forming a surface shape in which protrusions and depressions are repeatedly disposed in a mesh pattern. With this configuration, an ink holding portion that generates a desired capillary force can be easily provided. The ink holding shape is not limited to such a groove or mesh-patterned configuration, and can be made by, for example, a porous material having openings on the surface. The capillary force in this case depends on the average pore diameter of the porous material.

(8) The above-described configurations according to (1) to (7) may further include an ink absorbing member configured to absorb the ink, in which at least a part of the portion including the ink holding shape may be in contact with the ink absorbing member, and in at least a part of a contact region where the at least the part of the portion including the ink holding shape is in contact with the ink absorbing member, a capillary force acting on the ink on a surface of the ink absorbing member may be larger than a capillary force generated by the ink holding shape and acting on the ink. With this configuration, at least a part of the ink held by the ink holding portion of the sealing portion moves from the portion in contact with the ink absorbing member to the ink absorbing member, and is absorbed or adsorbed by the ink absorbing member. Note that the portion where the ink holding shape is provided need not be in direct contact with the ink absorbing member, and may be in contact with the ink absorbing member with, for example, a capillary flow path member in between, the capillary flow path member exhibiting a capillary force of substantially the same degree.

(9) In the above configurations according to (1) to (8), in the at least the part of the contact region, a width of a plurality of grooves of the ink holding shape may be larger than a width of a groove-equivalent portion of a structure existing on the surface of the ink absorbing member. With this configuration, the difference in the capillary force related to the movement of ink can be managed as the width of the groove or the groove-equivalent portion, and the design and maintenance are facilitated.

(10) As other embodiments of the present disclosure, a printing apparatus, a printing system, and the like are also possible. These include the ink cartridge according to any one of the above-described (1) to (9), and the printing machine including a mounting portion to which the ink cartridge is mounted in a state in which the sealing portion is removed, the ink introduction portion to be inserted through the opening portion of the ink cartridge mounted to the mounting portion, and a printing portion configured to perform printing by using the ink supplied from the ink cartridge through the ink introduction portion. With this configuration, the sealing portion can be easily separated from the ink cartridge, and the ink cartridge can be easily mounted to the printing machine, so that the printing apparatus can be easily used. This configuration also saves the effort of peeling off the film for making the ink supply portion usable, and the film having been forgotten to be peeled off or having been left unpeeled does not enter the inside of the printing machine. Accordingly, this configuration ensures easy handling and maintenance. A part of the separation portion may include a shape protruding toward the outside of the bottom wall of the ink cartridge. By using this shape, the ink cartridge in which the sealing portion is not separated can be easily prevented from being mounted to the printing machine.

(11) In each of the above-described embodiments, a part of the configurations implemented by hardware may be replaced by software. At least a part of the configuration implemented by software can also be implemented by a discrete circuit configuration. When some or all of the functions of the present disclosure are implemented by software, the software (computer program) can be provided in a form stored in a computer-readable recording medium. The "computer-readable recording medium" is not limited to a portable recording medium such as a flexible disk or a compact disc read only memory (CD-ROM) and also encompasses an internal storage device in a computer, such as random access memory (RAM) or read only memory (ROM) of various kinds, or an external storage device fixed to a computer, such as a hard disk. That is, the "computer-readable recording medium" has a broad meaning encompassing any recording medium that can fix a data packet not temporarily.

The present disclosure is not limited to the above-described embodiments, and can be realized in various configurations without departing from the spirit of the present disclosure. For example, appropriate replacements or combinations may be made to the technical features in the embodiments corresponding to the technical features in the aspects described in the SUMMARY section, in order to solve some or all of the above-described problems or to achieve some or all of the above-described effects. Additionally, when the technical features are not described herein as essential technical features, such technical features may be deleted as appropriate.

What is claimed is:

1. An ink cartridge to be mounted to a printing machine including an ink introduction portion, the ink cartridge comprising,
- a containing portion configured to contain ink;
- a bottom wall being one of wall surfaces forming the ink cartridge, the bottom wall forming an opening portion through which the ink introduction portion is inserted;
- a sealing portion formed as a part of the bottom wall and having a shape configured to close the opening portion;
- a separation portion provided at a boundary between the sealing portion and the bottom wall, the separation portion being configured to make the sealing portion removable from the bottom wall; and
- an ink supply portion configured to supply the ink contained in the containing portion to the printing machine when the ink introduction portion is inserted through the opening portion exposed by removing the sealing portion from the bottom wall by the separation portion,
- wherein in the separation portion, a strength of a part of the bottom wall is lower than a strength of a portion other than the separation portion.

2. A printing apparatus comprising:
- the ink cartridge according to claim 1; and
- the printing machine including
  - a mounting portion to which the ink cartridge is mounted in a state in which the sealing portion is removed,
  - the ink introduction portion to be inserted through the opening portion of the ink cartridge mounted to the mounting portion, and
  - a printing portion configured to perform printing by using the ink supplied from the ink cartridge through the ink introduction portion.

3. An ink cartridge to be mounted to a printing machine including an ink introduction portion, the ink cartridge comprising:
- a containing portion configured to contain ink;
- a bottom wall being one of wall surfaces forming the ink cartridge, the bottom wall forming an opening portion through which the ink introduction portion is inserted;
- a sealing portion formed as a part of the bottom wall and having a shape configured to close the opening portion;

a separation portion provided at a boundary between the sealing portion and the bottom wall, the separation portion being configured to make the sealing portion removable from the bottom wall; and an ink supply portion configured to supply the ink contained in the containing portion to the printing machine when the ink introduction portion is inserted through the opening portion exposed by removing the sealing portion from the bottom wall by the separation portion, wherein:

the sealing portion includes a protruding portion formed toward an outside of the bottom wall, the protruding portion is configured as a tab with which the sealing portion is removed from the bottom wall in the separation portion by being moved to the outside of the bottom wall, and the protruding portion includes a first formation portion formed toward the outside of the bottom wall from a position closer to a periphery than to a center of the sealing portion and a second formation portion formed in a direction crossing the first formation portion.

4. A printing apparatus comprising:

the ink cartridge according to claim 3; and the printing machine including a mounting portion to which the ink cartridge is mounted in a state in which the sealing portion is removed, the ink introduction portion to be inserted through the opening portion of the ink cartridge mounted to the mounting portion, and a printing portion configured to perform printing by using the ink supplied from the ink cartridge through the ink introduction portion.

5. An ink cartridge to be mounted to a printing machine including an ink introduction portion, the ink cartridge comprising:

a containing portion configured to contain ink;

a bottom wall being one of wall surfaces forming the ink cartridge, the bottom wall forming an opening portion through which the ink introduction portion is inserted;

a sealing portion formed as a part of the bottom wall and having a shape configured to close the opening portion;

a separation portion provided at a boundary between the sealing portion and the bottom wall, the separation portion being configured to make the sealing portion removable from the bottom wall;

an ink supply portion configured to supply the ink contained in the containing portion to the printing machine when the ink introduction portion is inserted through the opening portion exposed by removing the sealing portion from the bottom wall by the separation portion; and an ink holding portion on an opening portion side of the sealing portion.

6. The ink cartridge according to claim 5, wherein the ink holding portion is at least a part of an inner surface of the sealing portion on the opening portion side and is a portion including an ink holding shape configured to generate a capillary force that has a predetermined magnitude or more and acts on the ink.

7. The ink cartridge according to claim 6, wherein the ink holding shape is one of a shape including a plurality of grooves formed in one direction, a shape obtained by combining a plurality of grooves formed in different directions, and a shape obtained by forming a surface shape in which protrusions and depressions are repeatedly disposed in a mesh pattern.

8. The ink cartridge according to claim 6, further comprising an ink absorbing member configured to absorb the ink, wherein at least a part of the portion including the ink holding shape is in contact with the ink absorbing member, and in at least a part of a contact region where the at least the part of the portion including the ink holding shape is in contact with the ink absorbing member, a capillary force acting on the ink on a surface of the ink absorbing member is larger than a capillary force generated by the ink holding shape and acting on the ink.

9. The ink cartridge according to claim 8, wherein in the at least the part of the contact region, a width of a plurality of grooves of the ink holding shape is larger than a width of a groove-equivalent portion of a structure existing on the surface of the ink absorbing member.

10. A printing apparatus comprising:

the ink cartridge according to claim 5; and the printing machine including a mounting portion to which the ink cartridge is mounted in a state in which the sealing portion is removed, the ink introduction portion to be inserted through the opening portion of the ink cartridge mounted to the mounting portion, and a printing portion configured to perform printing by using the ink supplied from the ink cartridge through the ink introduction portion.

* * * * *